United States Patent
Pandurangi et al.

(10) Patent No.: US 11,722,522 B2
(45) Date of Patent: Aug. 8, 2023

(54) CLOUD SECURITY POSTURE MANAGEMENT SYSTEMS AND METHODS WITH A CLOUD-BASED SYSTEM

(71) Applicant: Zscaler, Inc., San Jose, CA (US)

(72) Inventors: Gururaj Pandurangi, Redmond, WA (US); Pravin Kulkarni, Pune (IN); Rahul Khengare, Pune (IN); Unmesh Meshram, Pune (IN); Santosh Kumar Abhayraj Yadav, Pune (IN); Shraddha Agrawal, Pune (IN); Ankit Rao, Pune (IN); Himalay Kondekar, Pune (IN); Girish Murlidhar Jaju, Pune (IN)

(73) Assignee: Zscaler, Inc., San Jose, CA (US)

( * ) Notice: Subject to any disclaimer, the term of this patent is extended or adjusted under 35 U.S.C. 154(b) by 248 days.

(21) Appl. No.: 17/027,830

(22) Filed: Sep. 22, 2020

(65) Prior Publication Data
US 2022/0046059 A1 Feb. 10, 2022

(30) Foreign Application Priority Data
Aug. 7, 2020 (IN) .............................. 202011033837

(51) Int. Cl.
*H04L 29/00* (2006.01)
*H04L 9/40* (2022.01)
(52) U.S. Cl.
CPC .......... *H04L 63/20* (2013.01); *H04L 63/1433* (2013.01)
(58) Field of Classification Search
CPC ............................ H04L 63/20; H04L 63/1433
See application file for complete search history.

(56) References Cited

U.S. PATENT DOCUMENTS

| 8,286,239 | B1 | 10/2012 | Sutton |
| 8,464,335 | B1 | 6/2013 | Sinha et al. |
| 8,763,071 | B2 | 6/2014 | Sinha et al. |

(Continued)

OTHER PUBLICATIONS

Y. Diogenes et al., "Microsoft Azure Security Center," Second Edition, Copyright © 2020 by Pearson Education, Inc., pp. 1-57.

(Continued)

*Primary Examiner* — Don G Zhao
(74) *Attorney, Agent, or Firm* — Baratta Law PLLC; Lawrence A. Baratta, Jr.

(57) ABSTRACT

Cloud Security Posture Management (CSPM) systems and methods include, in a node in a cloud-based system, obtaining a plurality of security policies and one or more compliance frameworks for a tenant of a cloud provider where the tenant has a cloud application deployed with the cloud provider, wherein each security policy defines a configuration and an expected value, and wherein each compliance framework includes one or more of the security policies; obtaining configurations of the cloud application; identifying misconfigurations of the cloud application based on a comparison of the obtained configurations with the plurality of security policies; analyzing the misconfigurations to determine risks including prioritization of the risks based on their likelihood of exposure to security breaches; and causing remediation of the identified misconfigurations and the determined risks, wherein the cloud-based system performs the CSPM service in addition to one or more additional cloud services.

18 Claims, 20 Drawing Sheets

(56) References Cited

U.S. PATENT DOCUMENTS

| | | |
|---|---|---|
| 8,955,091 B2 | 2/2015 | Kailash et al. |
| 9,060,239 B1 | 6/2015 | Sinha et al. |
| 9,065,800 B2 | 6/2015 | Devarajan et al. |
| 9,119,017 B2 | 8/2015 | Sinha |
| 9,350,644 B2 | 5/2016 | Desai et al. |
| 9,369,433 B1 | 6/2016 | Paul et al. |
| 9,531,758 B2 | 12/2016 | Devarajan et al. |
| 9,621,574 B2 | 4/2017 | Desai et al. |
| 9,654,507 B2 | 5/2017 | Gangadharappa et al. |
| 9,712,388 B2 | 7/2017 | Mishra et al. |
| 9,912,638 B2 | 3/2018 | Kailash et al. |
| 9,935,955 B2 | 4/2018 | Desai et al. |
| 10,044,719 B2 | 8/2018 | Desai et al. |
| 10,142,362 B2 | 11/2018 | Weith et al. |
| 10,225,740 B2 | 3/2019 | Bansal et al. |
| 10,587,671 B2 | 3/2020 | Verma et al. |
| 10,609,083 B2 | 3/2020 | Kailash et al. |
| 10,904,277 B1* | 1/2021 | Sharifi Mehr ...... H04L 63/1425 |
| 2010/0077444 A1* | 3/2010 | Forristal ............... G06F 21/577 726/1 |
| 2011/0289588 A1* | 11/2011 | Sahai .................... G06Q 90/00 726/25 |
| 2014/0172706 A1* | 6/2014 | Condry .............. G06Q 30/0601 705/44 |
| 2014/0208426 A1 | 7/2014 | Natarajan et al. |
| 2015/0319182 A1 | 11/2015 | Natarajan et al. |
| 2017/0353483 A1* | 12/2017 | Weith ...................... G06F 16/23 |
| 2017/0359220 A1 | 12/2017 | Weith et al. |
| 2018/0115463 A1 | 4/2018 | Sinha et al. |
| 2019/0141015 A1* | 5/2019 | Nellen ................ H04L 63/0218 |
| 2019/0158503 A1 | 5/2019 | Bansal et al. |
| 2019/0158516 A1 | 5/2019 | Sharma et al. |
| 2019/0370468 A1* | 12/2019 | Soby ....................... G06F 21/57 |
| 2020/0036574 A1 | 1/2020 | Parra et al. |
| 2020/0077265 A1 | 3/2020 | Singh et al. |
| 2020/0204551 A1 | 6/2020 | Singh et al. |
| 2020/0252422 A1* | 8/2020 | Davis ................... H04L 63/102 |
| 2021/0234885 A1* | 7/2021 | Campbell ........... H04L 63/1466 |
| 2021/0352136 A1* | 11/2021 | Dojka ................... H04L 63/1433 |
| 2022/0046059 A1* | 2/2022 | Pandurangi ............. H04L 63/20 |
| 2022/0210141 A1* | 6/2022 | Parekh .................... H04L 63/08 |

OTHER PUBLICATIONS

R. Wason et al., "An Integrated CASB Implementation Model to Enhance Enterprise Cloud Security," Apr. 2020, pp. 1-42.

* cited by examiner

CLOUD SECURITY POSTURE MANAGEMENT SYSTEMS AND METHODS WITH A CLOUD-BASED SYSTEM

FIELD OF THE DISCLOSURE

The present disclosure relates generally to networking and computing. More particularly, the present disclosure relates to Cloud Security Posture Management (CSPM) systems and methods with a cloud-based system.

BACKGROUND OF THE DISCLOSURE

Tenants (e.g., corporations, enterprises, organizations, etc.) are moving their users to various cloud services, applications, Software-as-a-Service (SaaS) applications, etc. Here, tenant resources are moved from a security perimeter controlled by Information Technology (IT) to the cloud. While there are numerous benefits to the cloud and the IT infrastructure is moving that direction, there are risks with data exposure, compliance violations, and the like along with complex security governance. Data breaches continue to occur and are growing at an alarming rate. Based on studies, application misconfiguration has been identified as the top reason for data breaches in the cloud, thus being key vulnerability for tenants. It may be due to an application development team misconfiguring a cloud application or a SaaS application incorrectly having been set up, leaving a vulnerability to attacks and exploits.

Further, having the application deployment and use spread out leads to complexity for assurance across users. Finally, security governance is a more complex task with the cloud. Before the cloud, IT typically had complete control over data and applications, i.e., they sat within an enterprise network with a security perimeter. With the cloud, enterprise data and applications are now outside of the security perimeter. Disadvantageously, nearly all successful attacks on cloud services are the result of misconfiguration, mismanagement, and mistakes.

Additionally, there is a significant difference between private clouds and public clouds. As described herein, a private cloud is one under the control of enterprise IT where enterprise IT has control of the environment, security perimeter, etc. Public clouds, on the other hand, are shared, dynamic, multi-tenant environments. Here, in public clouds, network security is a shared responsibility, and identity (of users, groups of users, tenants, etc.) is the security perimeter. Examples of public clouds include Amazon Web Services (AWS), Azure from Microsoft, Google Cloud, etc. Other examples of cloud services include Office 365, Google applications, etc. However, most enterprises are deploying resources in both private and public clouds. Enterprises in a public cloud are referred to as a tenant. Enterprises are struggling with cloud security and compliant, i.e., how to prevent data breaches, how to govern cloud security, how to enforce compliance, etc.

As such, there is a need for Cloud Security Posture Management (CSPM) to assist tenants in identifying and remediating problems with their cloud infrastructure.

BRIEF SUMMARY OF THE DISCLOSURE

The present disclosure relates to Cloud Security Posture Management (CSPM) systems and methods with a cloud-based system. Specifically, the CSPM systems and methods automatically identify and remediate application misconfigurations in SaaS, Infrastructure-as-a-Service (IaaS), and Platform-as-a-Service (PaaS) applications, to reduce risk, ensure compliance, etc. The CSPM systems and methods can be delivered through a cloud-based system that is configured to offer cloud security services. The objective is to prevent cloud misconfigurations, unify visibility for IT, and automate remediation. Specifically, the objective is to allow enterprises to utilize public cloud technologies while having the benefits of security with private cloud, etc. The prevention of misconfiguration automatically prevents misconfigurations that lead to data loss, application breaches, and downtime. The visibility enables IT to have a single view of users for compliance visibility. Finally, remediation can be automated to prevent users from being vulnerable to outside threats. The present disclosure operates with public, private, and hybrid clouds, with a specific focus on public cloud technologies.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to Cloud Security Posture Management (CSPM) systems and methods with a cloud-based system. Specifically, the CSPM systems and methods automatically identify and remediate application misconfigurations in SaaS, Infrastructure-as-a-Service (IaaS), and Platform-as-a-Service (PaaS) applications, to reduce risk, ensure compliance, etc. The CSPM systems and methods can be delivered through a cloud-based system that is configured to offer cloud security services. The objective is to prevent cloud misconfigurations, unify visibility for IT, and automate remediation. Specifically, the objective is to allow enterprises to utilize public cloud technologies while having the benefits of security with private cloud, etc. The prevention of misconfiguration automatically prevents misconfigurations that lead to data loss, application breaches, and downtime. The visibility enables IT to have a single view of users for compliance visibility. Finally, remediation can be automated to prevent users from being vulnerable to outside threats. The present disclosure operates with public, private, and hybrid clouds, with a specific focus on public cloud technologies.

Example Cloud-Based System

Figure 1:
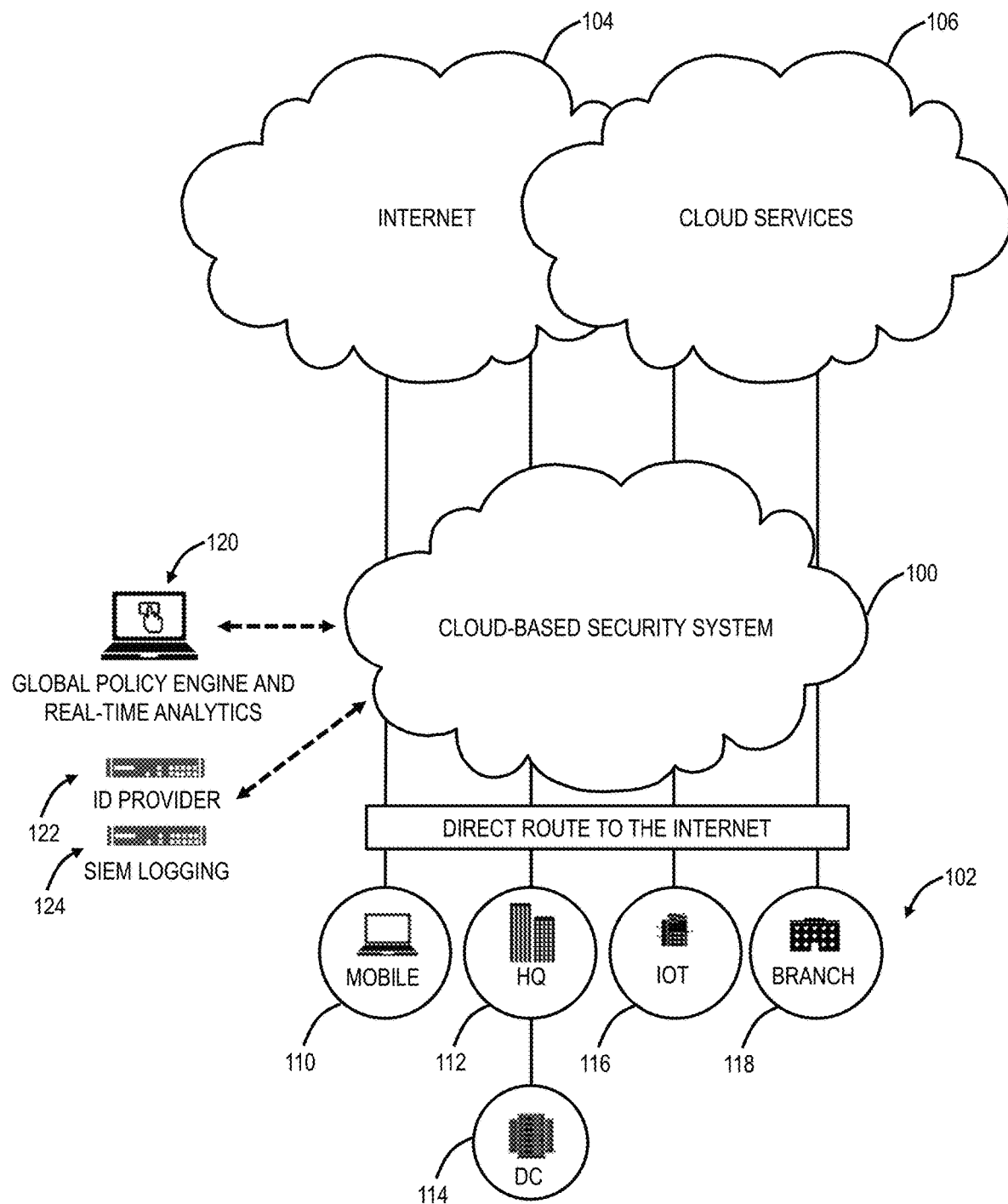
FIG. 1 is a network diagram of a cloud-based system offering security as a service.

FIG. 1 is a network diagram of a cloud-based system 100 offering security as a service, i.e., a cloud-based security system. Specifically, the cloud-based system 100 can offer a Secure Internet and Web Gateway as a service to various users 102, as well as other cloud services. In this manner, the cloud-based system 100 is located between the users 102 and the Internet as well as any cloud services in a public cloud 106 (or applications) accessed by the users 102. As such, the cloud-based system 100 provides inline monitoring inspecting traffic between the users 102, the Internet 104, and the public cloud 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services such as in the public cloud 106. The file type controls enable true file type control by the user, location, destination, etc. to determine which files are allowed or not.

Figure 3:
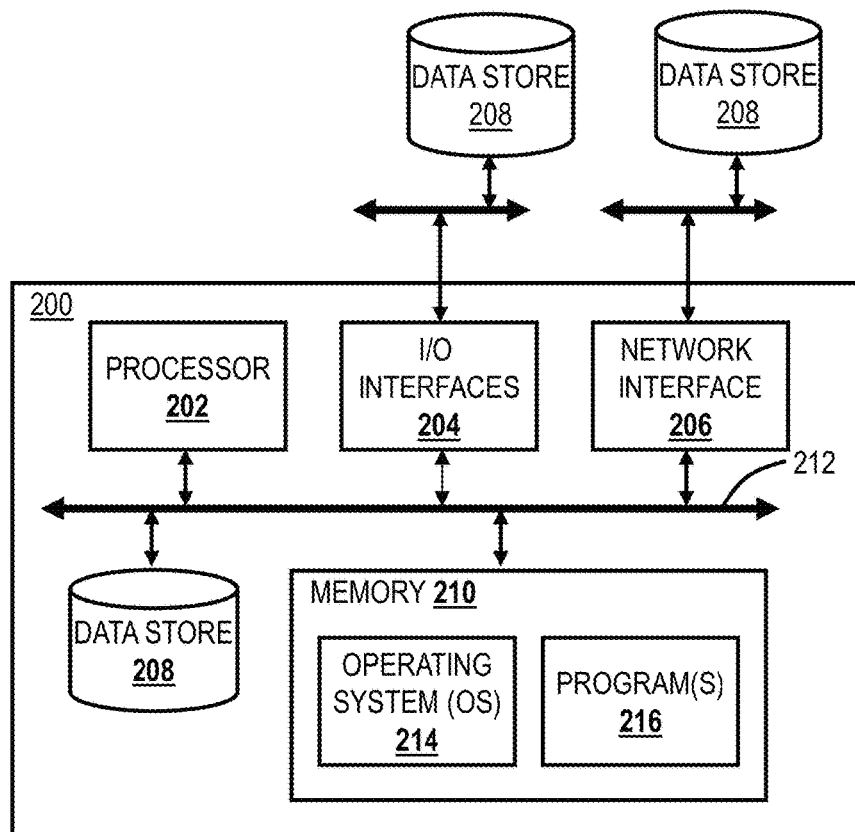

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the public cloud 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the public cloud 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
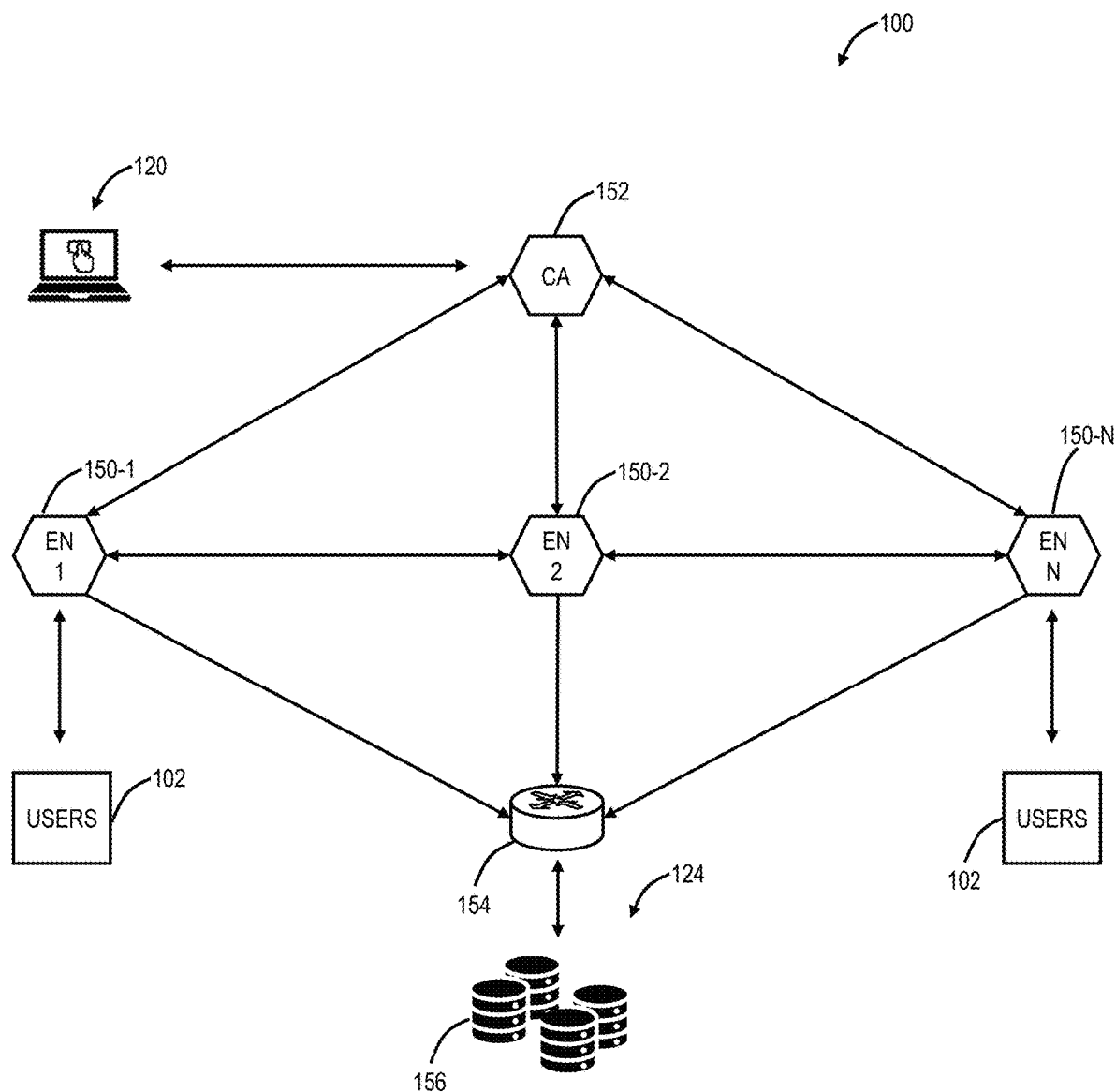
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. A cloud service is any service made available to users on-demand, such as via the public cloud 106, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
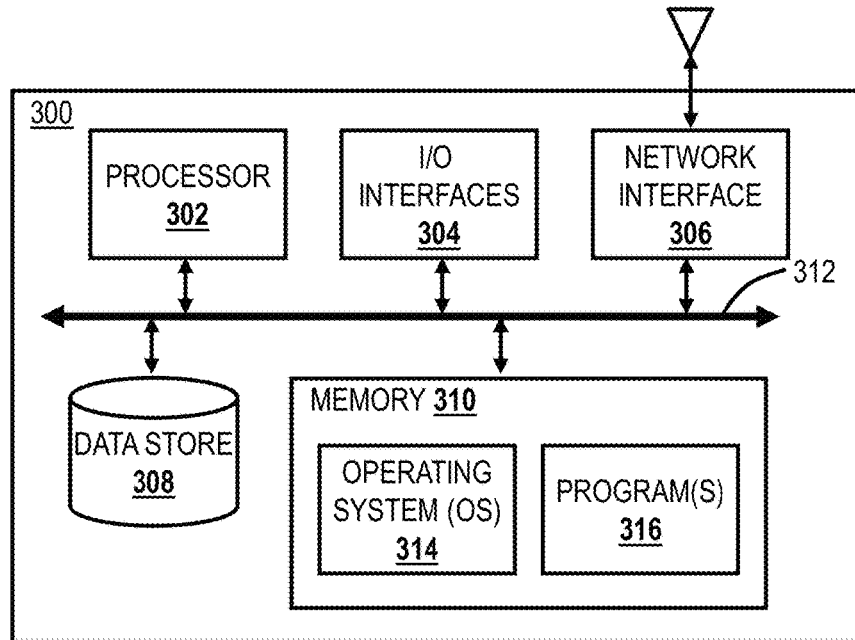

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
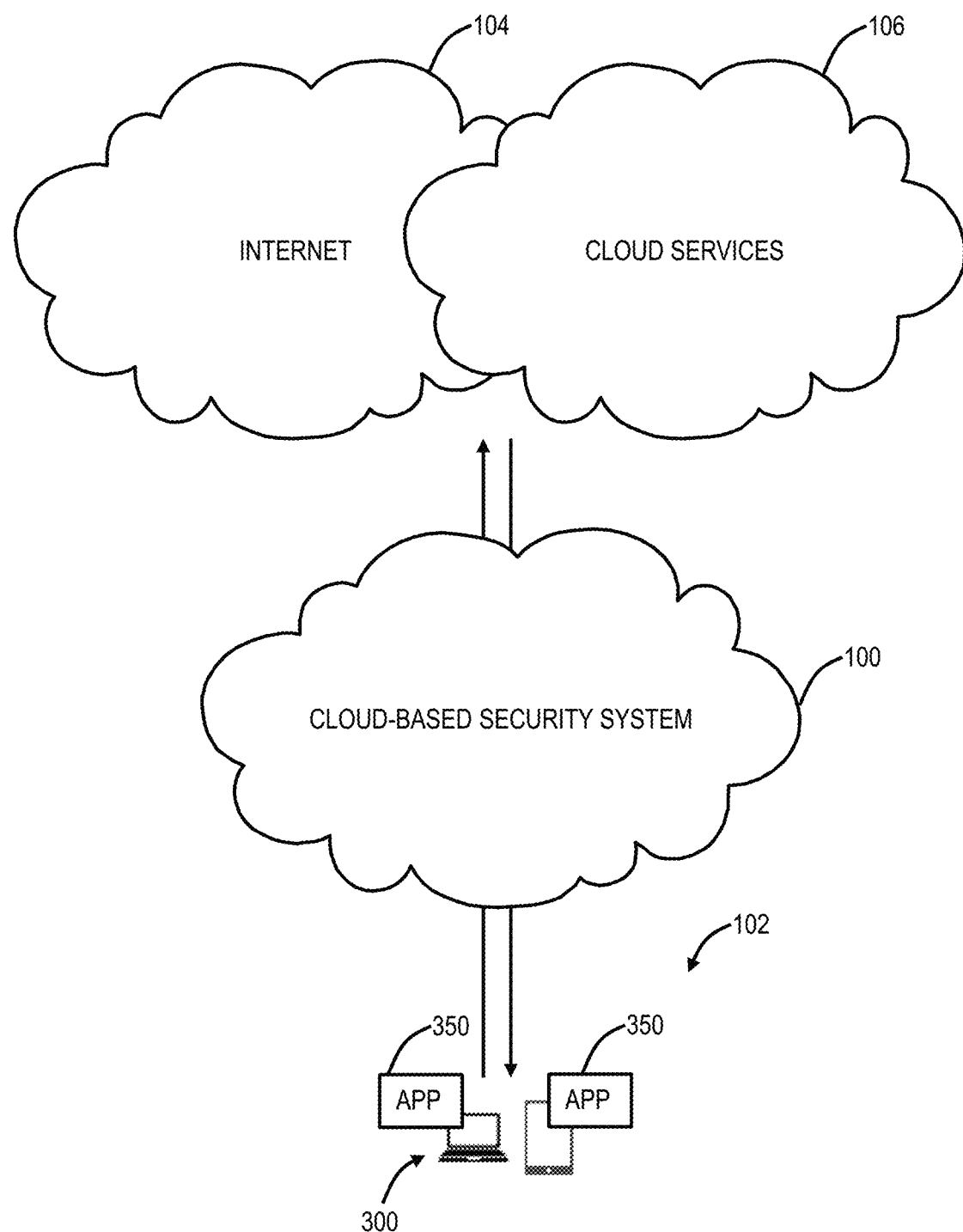
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the data center and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 before accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
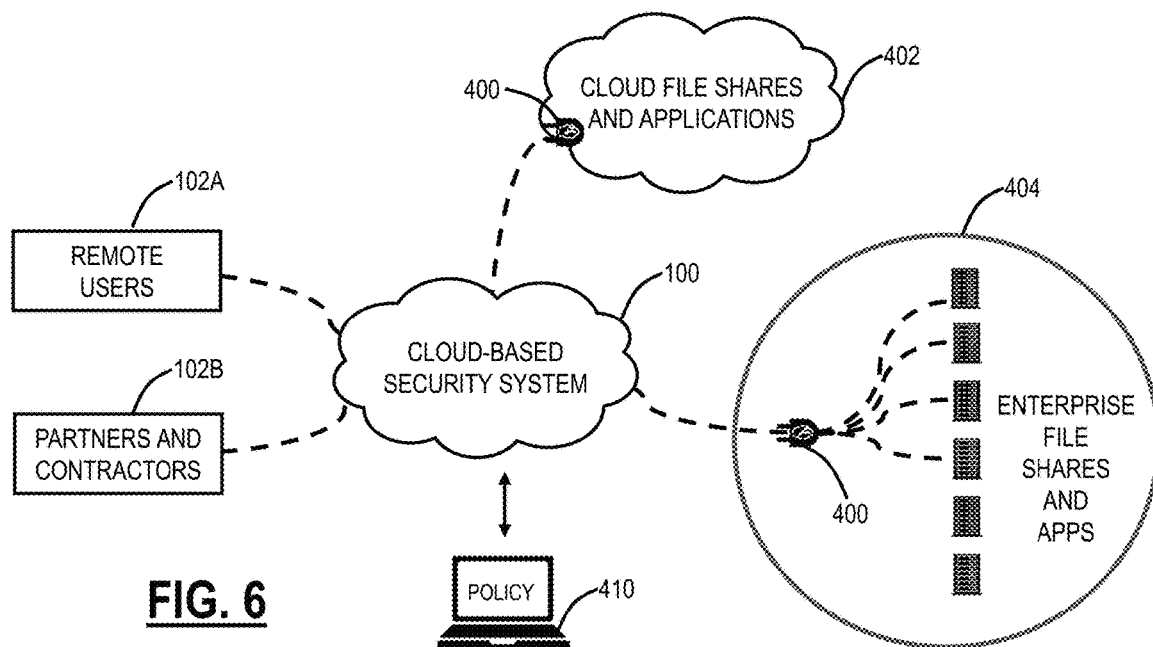
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority node 152 to push policy 410, and the cloud-based system 100 to stitch the applications 402, 404 and the software connectors 402, 404 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 6 can include the ZPA service from Zscaler, Inc.

Digital Experience Monitoring

Figure 7:
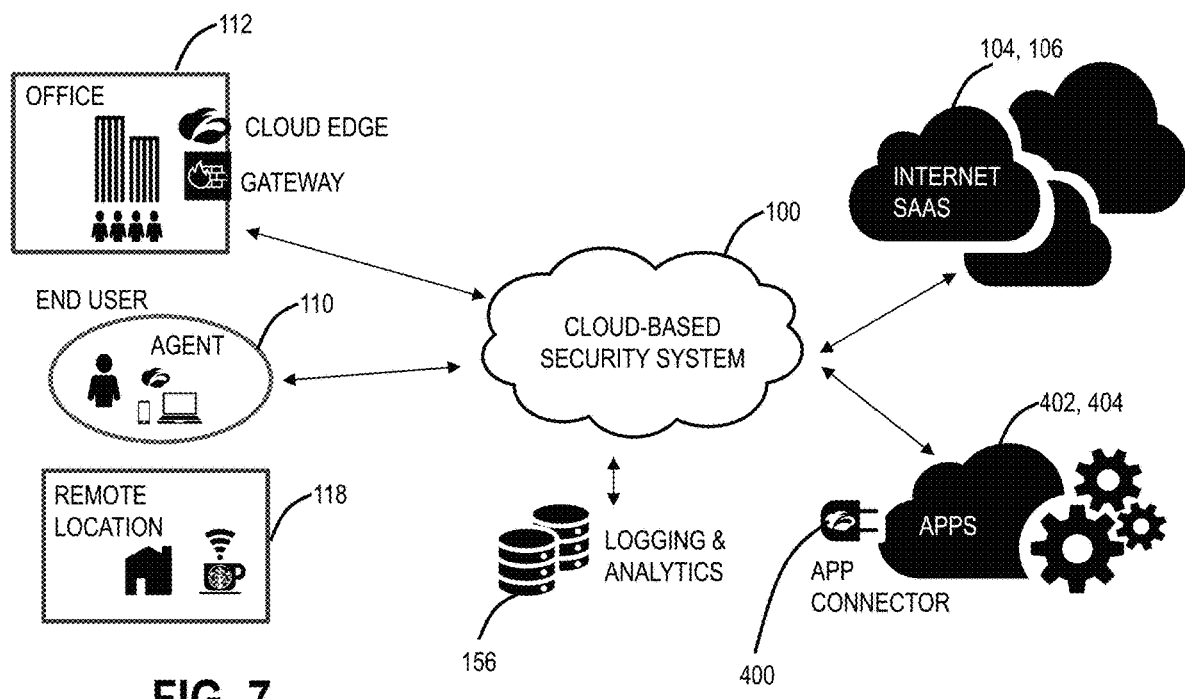
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the public cloud 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-related data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-related data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-related data (endpoint-related data)

| System details | Network (config) |
|---|---|
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

CSPM—Introduction

For enterprises, new applications are being developed quickly, and the public cloud is the only environment that supports the necessary pace of change. Yet, the use of the public cloud has led to:

1. Data breaches resulting from misconfigurations of cloud infrastructure that continue to expose enormous amounts of confidential customer data, leading to legal liability and financial losses;

2. Continuous compliance for cloud-based workloads is impossible to achieve using traditional on-premises tools and processes; and 3. Challenges implementing cloud governance (visibility, policy enforcement across business units, lack of knowledge about cloud security controls) continue to increase as cloud adoption grows within the organization.

As such, CSPM systems and methods are presented for enhanced, dynamic visibility into security posture and seamless collaboration between security and development teams to enforce security standards. An objective is to provide additional control to IT over applications and users deployed in the cloud.

Shared Security Responsibility in the Public Cloud

Figure 8:
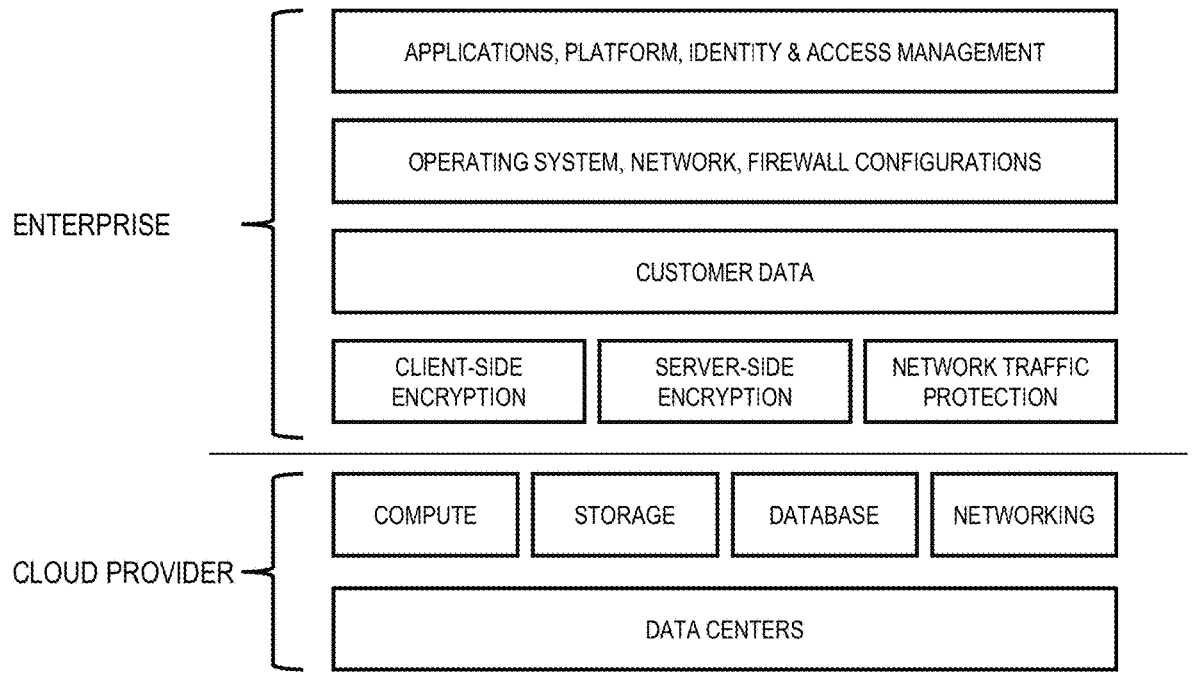
FIG. 8 is a diagram of a logical model of the shared security responsibility in the public cloud between an enterprise and a cloud provider.

FIG. 8 is a diagram of a logical model of the shared security responsibility in the public cloud between an enterprise and a cloud provider. As described herein, a cloud provider can also be referred to as a Cloud Service Provider (CSP), a service provider, etc. The cloud provider may offer a public cloud, SaaS, PaaS, IaaS, etc. The cloud provider has built infrastructure from various hardware and software components (compute, storage, database, networking) and maintains and operates the same in data centers. The cloud providers are responsible for security "of" the cloud. They made significant investments in cloud infrastructure security and offered multiple compliance certifications. The customer (enterprise, tenant, etc.) is responsible for security in the cloud. This includes components that customers bring into the cloud and secure configurations of the cloud infrastructure. The term cloud infrastructure refers to all cloud services consumed by the customer, such as hosts and container clusters, IaaS, PaaS, SaaS, and security services.

Again, misconfiguration is the biggest cloud security threat. But the contributors to other possible threats (such as unauthorized access, insecure interfaces, hijacking of accounts, etc.), the likely causes are mostly attributed to misconfigurations.

The network was once the secure perimeter organizations relied upon to protect their valuable information stored in databases and file shares. In the cloud, a database can be individually exposed to the internet with a few simple configuration changes. A locked-down data store acts as an inhibitor for developers during development phases, and they may keep it open. These configurations unintentionally slip into production environments.

Traditional security and compliance audits are tedious and slow manual processes. For example, a security audit may include interviews of IT, screenshots of product configurations as proof of compliance, etc. in the cloud, the speed of cloud infrastructure change is so high that the time an audit is complete, the infrastructure could have been rebuilt many times. Automation of security and compliance assurance is the only way for security to keep up with the speed of development and frequency of releases in the cloud.

Challenges to Prove Compliance

Regulated industries have to adhere to specific industry benchmarks such as Payment Card Industry Data Security Standard (PCI DSS) for retail, Health Insurance Portability and Accountability Act (HIPAA) for healthcare, and Federal Financial Institutions Examination Council (FFIEC) for financial services, NIST and many more. Businesses still conduct mostly interview-based compliance assessments. Gathering evidence and mapping it to the control frameworks is a massive undertaking. These compliance frameworks provide high-level controls that need to be met continuously. Many compliance frameworks (such as PCI DSS) are incorporating the concept of continuous compliance as a requirement. All of these problems get compounded for cloud workloads that are changing rapidly.

Cloud Provider Tools

Cloud providers offer tools to enable customer visibility into security and compliance posture. These products offer basic security policy coverage and support a limited set of compliance frameworks. To enable organization-wide security and compliance assurance, significant integration and custom development are required. As a result, organizations that deploy applications in the public Cloud are forced to accept tradeoffs between development speed and security risk. Larger organizations with hundreds of developers continuously releasing new code into production will have to implement a fully automated cloud security and compliance assurance.

CSPM

Figure 9:
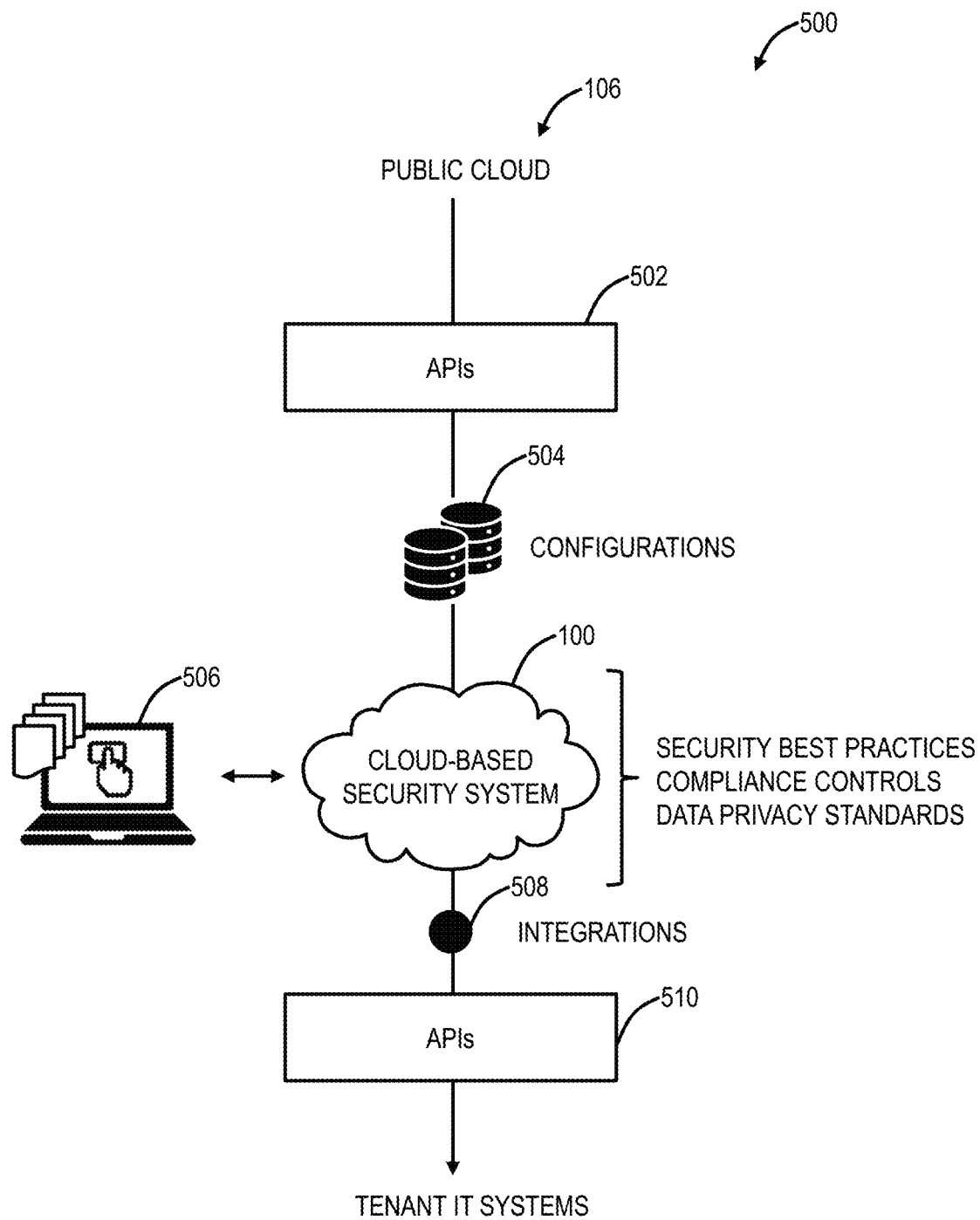
FIG. 9 is a network diagram of a CSPM system, such as implemented through the cloud-based system of FIGS. 1 and 2.

CSPM provides systems and methods to automate security and compliance assurance and address the need for proper control over cloud infrastructure configurations. FIG. 9 is a network diagram of a CSPM system 500, such as implemented through the cloud-based system 100. The CSPM system 500 can be implemented through the cloud-based system 100 via Application Programming Interfaces (API) 502 connected to the public Cloud 106 for obtaining configurations 504, which are analyzed for security posture, as described in detail herein. Specifically, the CSPM system 500 is configured to analyze the configurations 504 for security best practices, compliance control, data privacy standards, and the like. The CSPM system 500 can provide a user interface 506 for results, policy configuration, etc. Further, the CSPM system 500 can support integration 508 to a tenant's IT system via APIs 510.

Figure 10:
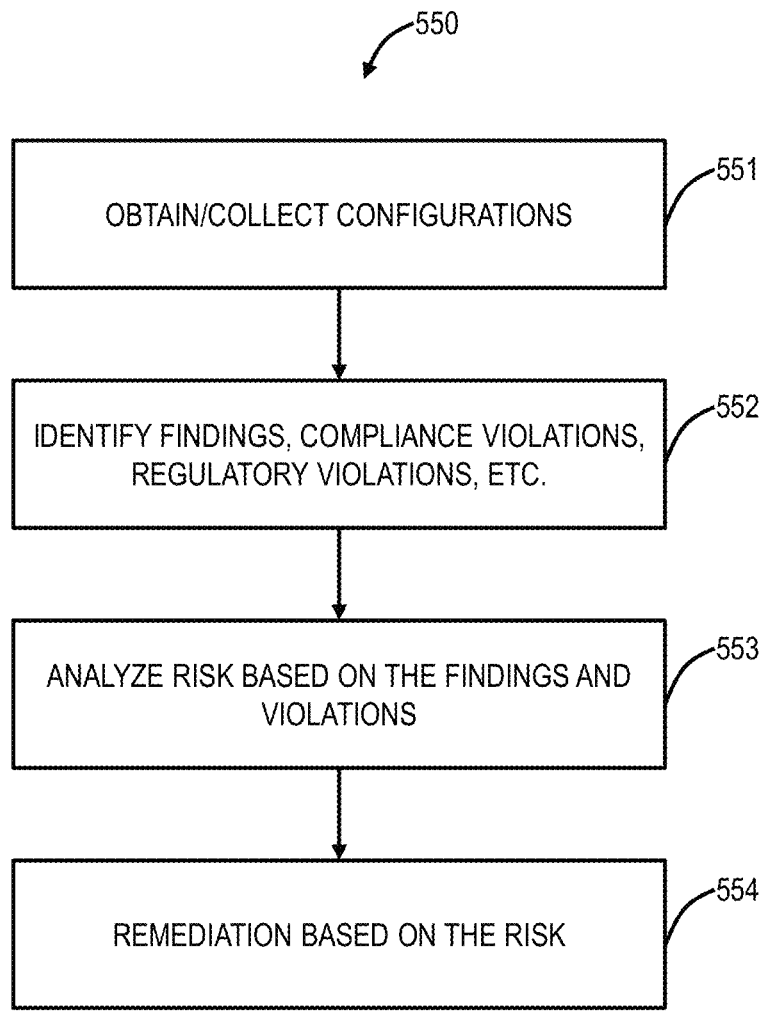
FIG. 10 is a flowchart of a CSPM process that can be implemented via the CSPM system of FIG. 9.

FIG. 10 is a flowchart of a CSPM process 550, which can be implemented via the CSPM system 500. The CSPM process 550 includes obtaining/collecting the configurations 504 (step 551). This can be via the APIs 502, and the configurations 504 can be from the public cloud 106, such as AWS, Azure, Office 365, Google Cloud, etc. Of course, the collecting and obtaining can be configured based on the specifics of each of the public clouds 106. For example, this can be different for AWS than Azure. Further, additional public clouds 106 are also contemplated, using the APIs 502. The collection is over the APIs 502, but in some embodiments, the public clouds 106 may require installation of a software agent for assistance in the collection of the configurations 504.

Before the collection, the CSPM process 550 requires onboarding where an enterprise creates cloud accounts with the relevant permissions. Note, the cloud account may be mostly read-only. Also, for cloud providers that do not have the necessary APIs 502, an agent can be deployed in the public cloud 106 to automate the collection and achieve the most comprehensive security policy coverage.

Also, many organizations are moving forward with multi-cloud approaches, i.e., using different public clouds 106 to leverage for their business applications best in class cloud services compared on cost, capabilities, security and scale. Likewise, the CSPM system 500 and the CSPM process 550 supports multiple cloud environments.

Enterprises with larger environments, such as with more than 10,000 cloud resources require: 1) high scalability in collecting, configuration metadata across a wide range of cloud resources; 2) the ability to store vast amounts of collected metadata in a database; 3) keeping the scan time as short as possible; and 4) quickly displaying security posture data on intuitive dashboards and reports. The CSPM system 500 and the CSPM process 550 can use the latest advancements in cloud computing, such as serverless functionality for metadata collection and NoSQL databases (Cosmos DB) for storing information. For each cloud infrastructure scan, thousands of parallel serverless functions get created for parallel metadata collection and storing in the database. The NoSQL database is the most scalable and fastest way for storing and retrieving data in the cloud. As such, the CSPM system 500 and the CSPM process 550 require only a few minutes to complete a scan and generate reports for further analysis.

Information stored as part of the metadata collection process is about actual cloud infrastructure configurations. If such information becomes accessible to hackers, this can lead to increased exposure to bad actors. Accordingly, the CSPM system 500 and the CSPM process 550 utilize full data encryption in transit and at rest, the most stringent Rules-Based Access Controls (RBAC) and clearly defined data retention policies.

Next, the CSPM process 550 includes identifying findings, compliance violations, regulatory violations, etc. based on the configurations 504 (step 552). The discovered configurations 504 are compared against built-in security policies for identifying misconfigurations at the security policy and resource level. It also provides a complete mapping of security policies within various compliance frameworks. The user interface 506 can include intuitive dashboards and reports for reviewing this information.

Next, the CSPM process 550 includes analyzing risk based on the findings and the violations (step 553). Here, the CSPM process enables various cloud governance features, including risk-based prioritization of the security posture, policy management (e.g., overrides, exceptions, etc.,) and configuration of private benchmarks for organizations that have multiple compliance standards or information security teams that need to customize the policy set for a specific architecture. Further, the analyzing can include a machine learning-based risk analysis to assess the exposure of the organization to security breaches.

Finally, the CSPM process 550 includes remediation based on the risk (step 554). This can include remediation steps for each and every security policy, and auto-remediation for a subset of the most critical security policies can be applied.

Identify Misconfigurations

The CSPM system 500 and the CSPM process 550 include security policies that are used to identify misconfigurations of cloud applications, services, SaaS applications, etc. ("cloud application") used by a tenant. As described herein, a security policy relates to an aspect of the cloud applications, and it can designate so-called best practices, i.e., how that aspect should be configured. The security policies can relate to the cloud infrastructure and to the SaaS/cloud applications themselves.

Some non-limiting examples of security policy coverage for the cloud infrastructure include compute configurations, networking configurations, storage configurations, database configurations, backup configuration, logging configuration, account security configuration, access control configuration, operating system configuration, key management, data-in-transit configuration (TLS/SSL, etc.), and the like. That is, the cloud infrastructure security policies relate to how the underly cloud resources should be properly configured. For a simple example, a policy of data-in-transit as unencrypted is a potential security risk.

Some non-limiting examples of the cloud application security policy coverage include identity and authentication settings, application permissions, application usage, auditing, data management, device management (e.g., Mobile Device Management (MDM)), email security, document sharing settings, and the like. That is, the cloud application security policies relate to how the cloud applications should be configured and used. For a simple example, a cloud application that has authentication turned off is a security risk.

With the security policies, the goal is to cover all of the most frequently consumed cloud applications along with an ability to add specific customer requirements. Each cloud provider has its own set of required policies. The security policies in the CSPM system 500 and CSPM process 550 can include the required policies from the cloud provider along with additional security policies, such as tenant-specific.

In addition to the security policies, the CSPM system 500 and CSPM process 550 can identify compliance with compliance frameworks. As described herein, a compliance framework includes benchmarks, laws, regulations, etc. that define how data and/or applications should work. These may be provided by an organization or alliance, specified by governments, specified by industry, etc.

Policy Management

The CSPM system 500 and CSPM process 550 provide various features to manage the application of security policies to discovered assets (cloud applications). For example, a user can exclude certain security policies, such temporarily (time-bounded) or permanently. A user can override certain security policies for tests. Also, users can specify manual policies.

Analyzing Risk

Security requirements vary significantly across organizations (tenants) based on factors such as industry, size, etc. Customers could decide to bring all of their controls (across all compliance and best-practices) into private benchmarks. Multiple individuals within the organization can collaborate in authoring it and start applying to specific cloud accounts.

The CSPM system 500 and CSPM process 550 offer an easy to use configuration interface to create private benchmarks from any existing standard or from scratch based on individual company requirements. These private benchmarks can be version controlled, so customers also use it to enforce higher standards over a period of time continually. A v1 private benchmark will be enforced to start with, a v2 private benchmark to improve their security posture in subsequent releases, and so on.

Figure 11:
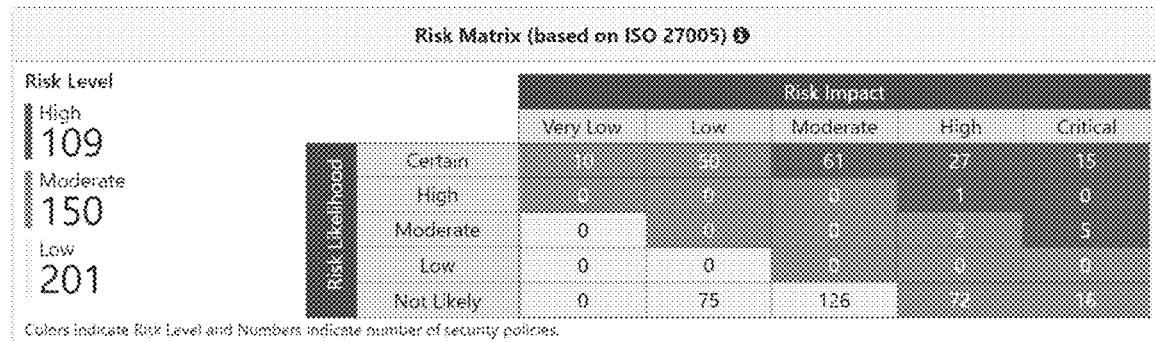
FIG. 11 is a table of an example CSPM risk-based prioritization matrix used in the CSPM system of FIG. 9 and CSPM process of FIG. 10 for analyzing and describing risk.

FIG. 11 is a table of an example CSPM risk-based prioritization matrix used in the CSPM system 500 and CSPM process 550 for analyzing and describing risk. In an embodiment, a CSPM risk-based prioritization matrix follows the ISO 27005 standard. The risk matrix automatically categorizes each security policy by risk impact and likelihood. Risk impact ranges from "Not Likely," "Low," "Moderate," and "High," to "Certain." Risk likelihood ranges from "Very Low," "Low," "Moderate," and "High" to "Critical." Risk impact is preset for each security policy. Risk likelihood is calculated dynamically based on multiple metrics and a machine learning algorithm. The risk matrix has the X-axis and Y-axis, showing the number of security policies in each X/Y segment. Accordingly, security policies with high-risk impact and high-risk likelihood are classified as a "High" risk level.

Remediation

When organizations deploy cloud infrastructure manually, they can need to update their configuration guides and remediate resources to make them compliant with all security policies in their private benchmark. The CSPM system 500 and CSPM process 550 offers security policy remediation guidance in the form of easy to understand steps using a cloud provider console and command lines or scripts when possible.

When certain types of misconfiguration occur in production, it may be too late to wait until a ticket is assigned to the right person or the right person is available in that work shift to fix it. Such critical security issues need to be resolved immediately. The CSPM system 500 and CSPM process 550 offer auto-remediation policies that get triggered after a deployment change has been initiated by a customer (e.g., new deployment or manually changing configurations using cloud provider consoles).

While visibility into misconfigurations is important, it is important to prevent misconfigurations from getting into production in the first place. Organizations that deploy cloud infrastructure manually should automate deployment for all critical resources.

Detailed CSM Process

Figure 12:
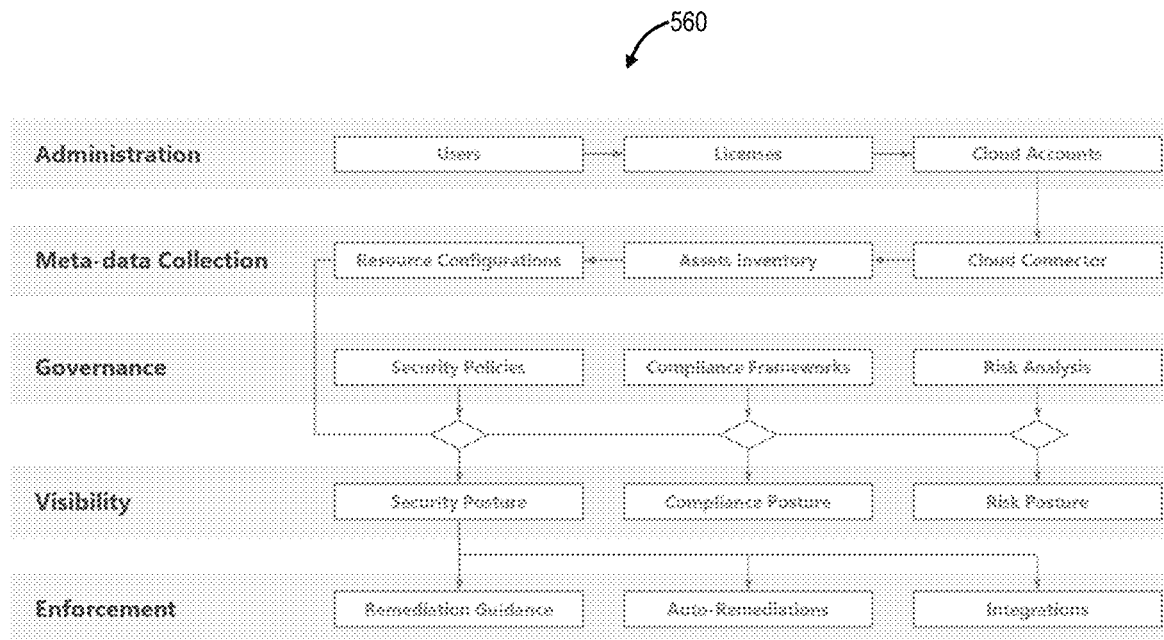
FIG. 12 is a flowchart of a CSPM process that presents additional details for the CSPM process of FIG. 10.

FIG. 12 is a flowchart of a CSPM process 560 that presents additional details for the CSPM process 550. The CSPM process 560 can be segregated into different phases—administration, metadata collection, governance, visibility, and enforcement. The administration includes managing users, licenses, cloud accounts, etc. The metadata collection includes cloud connectors associated with the CSPM system 500 and/or the cloud-based system 100 communication with the cloud provider to gather asset inventory and configuration of cloud applications and resources. The governance includes the security policies, compliance frameworks, risk impact and likelihood, etc. For example, the security policies can be defined as "out of the box." Of course, manual security policies can also be included. The governance also includes the policy exceptions and prioritize fixes using risk-based prioritizations. The visibility includes access to security posture, compliance posture, and risk posture dashboards (UIs). The enforcement includes remediation guidance, auto-remediation, integrations such as with tenant IT systems to log tickets, provide data feeds, send notifications, etc.

For the assets inventory, as part of metadata collection, during each scan, the CSPM process 560 retrieves the Asset Inventory information for each Cloud Account and stores these configurations in a data store. Assets Inventory includes Cloud Connector (AWS, Azure, Office 365), Cloud Account, Resource Group for Azure and Tags for AWS, Resource Name and Resource Configurations (meta-data).

The CSPM process 560 includes three areas for analysis—security posture, compliance posture, and risk posture. These can be analyzed together in combination or separately.

For the security posture, the CSPM process 560 includes comparing actual Resource configurations against cloud security best practices (security policies) to determine security policy status "Pass" or "Fail" at a Resource level. "Pass" status means the Resource is compliant with the policy. "Fail" status means the Resource is not compliant with the policy. The security policy status is determined based on the number of compliant resources. The policy is assigned a "Pass," "Pass(O)," "Warn," "Fail," "Prerequisite," "Manual," or "No resources" status based on Resource Status for relevant to this cloud policy resources. "Pass" status is assigned when configurations of all resources have "Pass" status. "Pass(O)" status is assigned when the user overrides any security policy status. "Warn" status is assigned to a security policy when configurations of some resources have "Pass" status, and the other resources have "Fail" status. "Manual" status is assigned to a security policy when automation is not available, i.e., the user can override the policy status to Pass/NA/Fail. "Fail" status is assigned to a security policy when all Resources have "Fail" status. "No resources" status is assigned to a security policy when onboarded cloud accounts do not have any relevant resources for this security policy. "Prerequisite" status is assigned to a security policy when onboarded cloud accounts do not have prerequisite permissions/configurations done to read the policy-related resource configuration.

Figure 13:
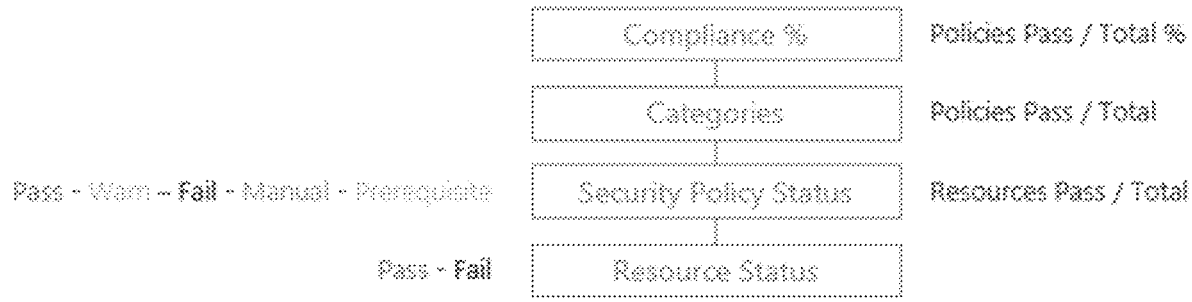
FIG. 13 is a visual illustration of a determination of the security posture for the CSPM process of FIG. 12.
Figure 14:
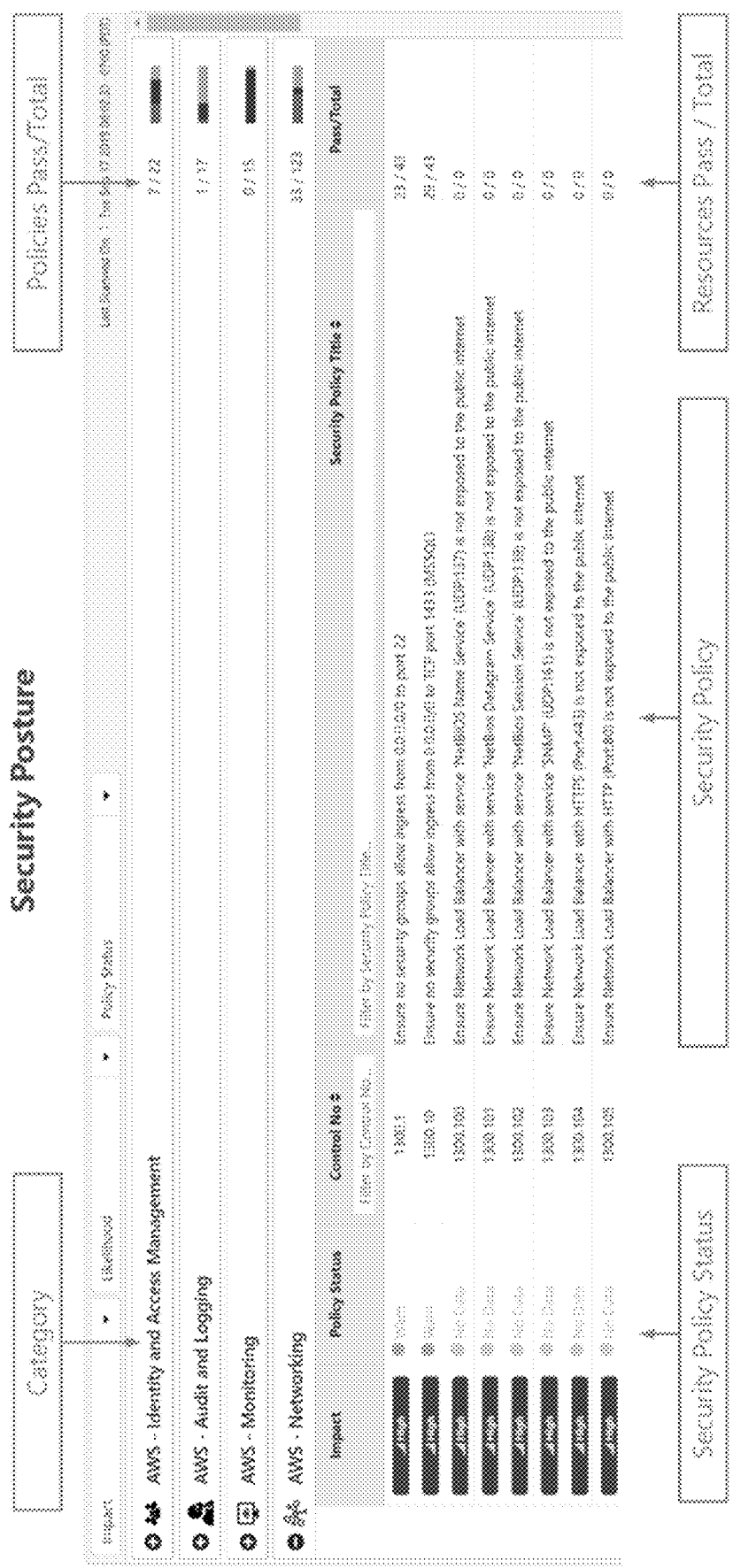
FIG. 14 is a screenshot of an example visualization of the security posture.

FIG. 13 is a visual illustration of a determination of the security posture. FIG. 14 is a screenshot of an example visualization of the security posture. The security posture visualization shows Categories and category level number of Polices Pass/Total. Under each category, a list of Security Policies is displayed with Security Policy Status and the number of Resources Pass/Total.

A Compliance Percentage is an aggregated percentage of fully compliant security policies (all resources under this security policy are compliant). There can be multiple out-of-the-box compliance frameworks. Security policies are mapped to compliance controls for each compliance framework, one or more security policies per compliance control.

Figure 15:
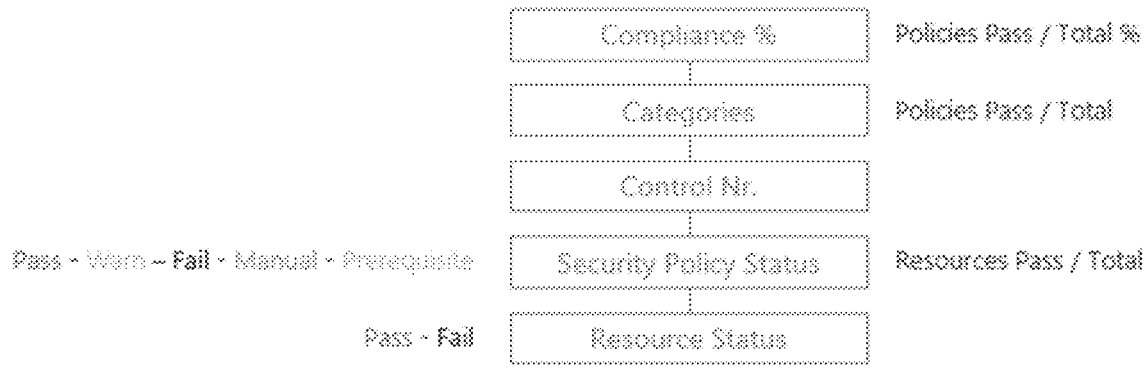
FIG. 15 is a visual illustration of a determination of the compliance posture.

FIG. 15 is a visual illustration of a determination of the compliance posture. The Compliance Percentage is an aggregated percentage of fully compliant security policies (all resources under this security policy are compliant). Fully compliant security policies can include status Pass and Pass(O). For the Resource Status, the CSPM process 560 can compares these actual Resource configurations against cloud security best practices (security policies) and determines security policy status "Pass" or "Fail" at a Resource level. "Pass" status means the Resource is compliant with the policy. "Fail" status means the Resource is not compliant with the policy. The Security Policy Status is determined based on the number of compliant resources. The policy is assigned a "Pass" (Pass+Pass(O)), "Warn," "Fail," "Prerequisite," "Manual," or "No resources" status based on Resource Status for relevant to this cloud policy resources.

Figure 16:
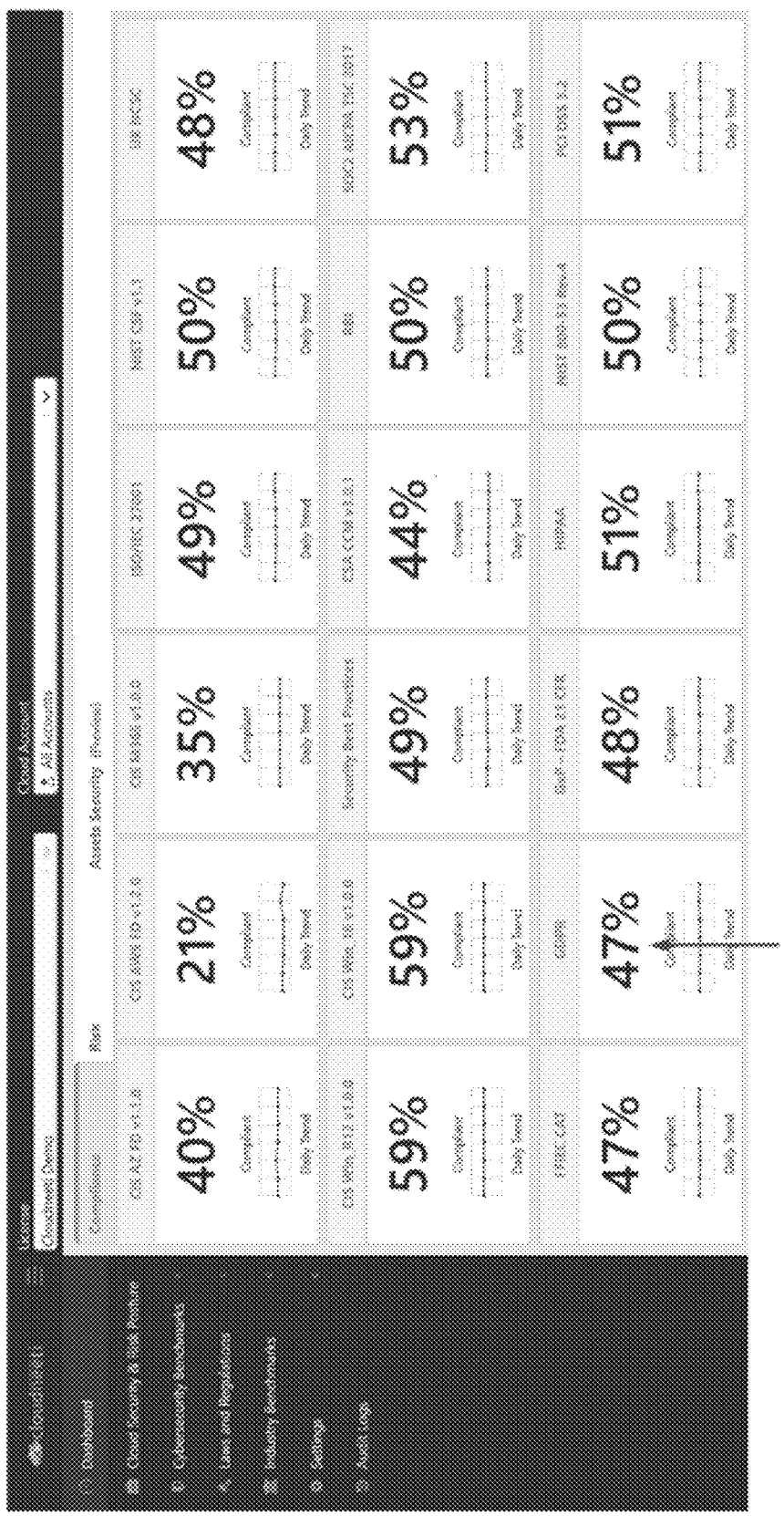
FIG. 16 is a screenshot of an example visualization of a compliance dashboard which illustrates the compliance percentages per compliance framework.
Figure 17:
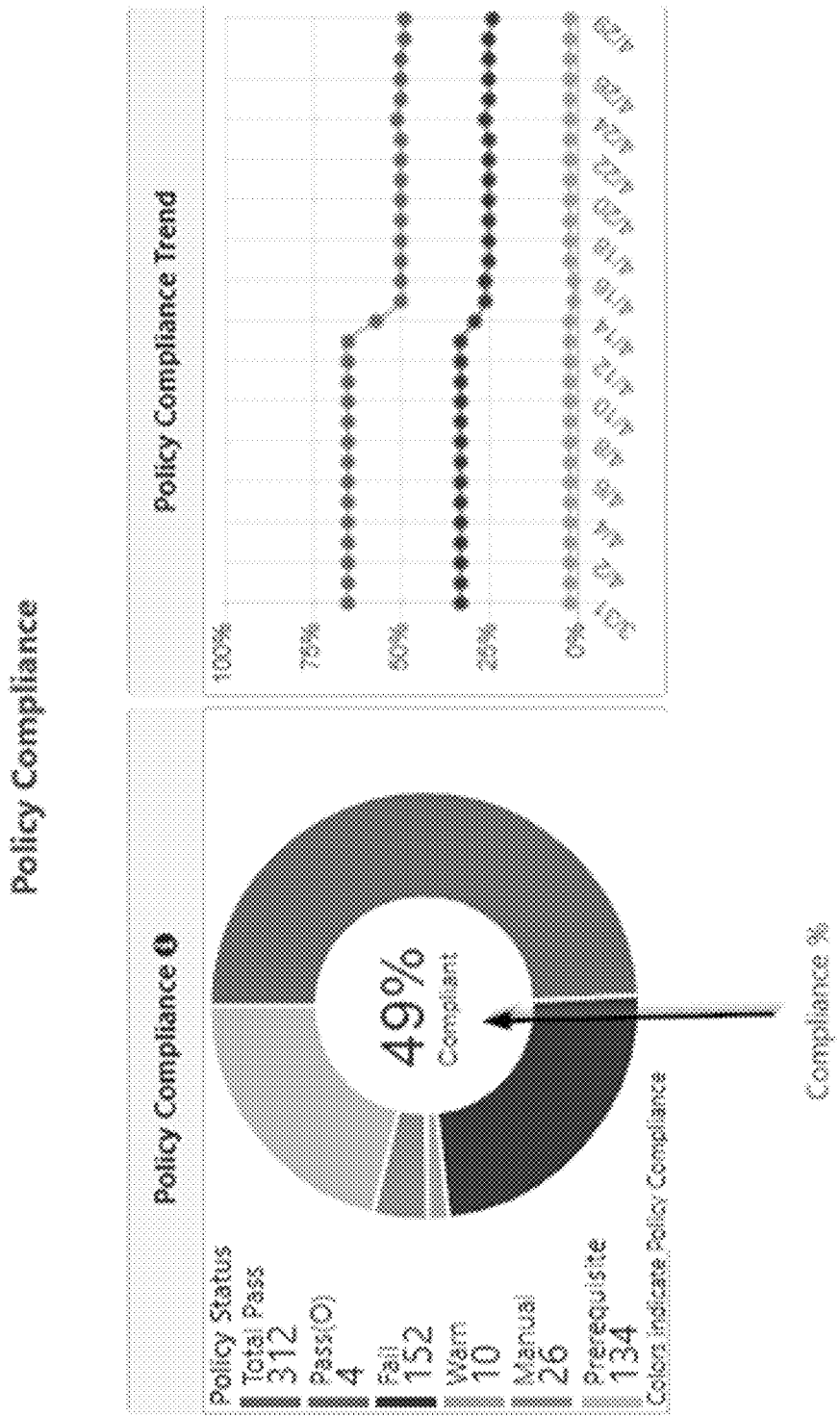
FIG. 17 is a screenshot of policy compliance, illustrating a chart of security policy compliance and a graph of security policy compliance over time.

FIG. 16 is a screenshot of an example visualization of a compliance dashboard, which illustrates the compliance percentages per compliance framework. The aggregate compliance percentages per compliance framework are calculated as a share of fully compliant cloud security policies out of the total number of security policies with data. FIG. 17 is a screenshot of policy compliance, illustrating a chart of security policy compliance and a graph of security policy compliance over time.

Risk Posture

Figure 18:
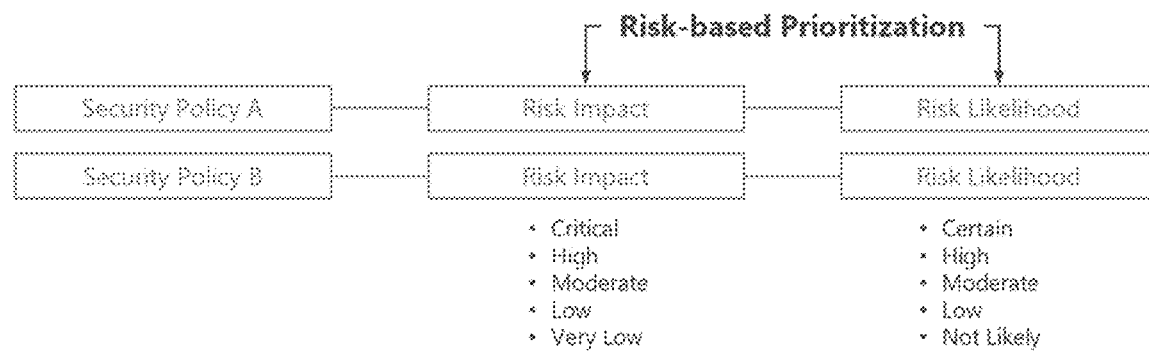
FIG. 18 is a visualization of risk-based prioritization for two example Security Policies A and B.

The objective of the CSPM system 500 and the CSPM processes 550, 560 is to provide a risk posture. The risk posture can include the risk-based prioritization matrix using the ISO 27005 standard (FIG. 11). The risk matrix is created by automatically categorizing each security policy for risk impact and risk likelihood. FIG. 18 is a visualization of risk-based prioritization for two example Security Policies A and B. Risk impact can be "Not Likely," "Low," "Moderate," "High," and "Certain." Risk likelihood can be "Very Low," "Low," "Moderate," "High," and "Critical." Risk impact is preset for each security policy. Risk likelihood is calculated each time based on multiple metrics using machine learning algorithms. The Risk matrix has the X-axis and Y-axis, showing the number of security policies in each X/Y segment. Accordingly, Security Policies with high-risk impact and high-risk likelihood constitute a set of Security Policies with severity "High."

The risk impact and risk likelihood categorization can be based on the following inputs:

Common reasons for security breaches over the last several years derived from publicly available information disclosed by businesses;

Prioritization of cloud security best practices provided by cloud providers such as Microsoft Azure, AWS, Office 365, etc.;

Inputs from Auditors and Risk Advisors across various project over the last few years;

Customer feedback on their experience with certain security controls.

Machine Learning algorithms to deliver high accuracy risk analytics.

Risk Impact is often defined as the consequences, or effects of a certain risk event happening, as related to a Software Application or an Organization. The impact of risk events can be defined in both qualitative and quantitative metrics. These metrics are cost, schedule, reputation, quality, scope, health, safety, etc.

In an embodiment, the Risk Impact five-point scale is defined below.

| Risk Impact | Objective: Cost Increase | Objective: Time Increase | Objective: Reputation Damage |
|---|---|---|---|
| Critical | >40% | 20-40% | Possibly rendering project useless |
| High | 20-40% | 10-20% | Unacceptable to sponsors & stakeholders |
| Moderate | 10-20% | 10-20% | Might require additional sponsor approvals |
| Low | <10% | <5% | Noticeable reduction in project quality |
| Very Low | insignificant | insignificant | Barely noticeable |

Risk Likelihood (or probability), is the possibility of a risk event occurring. It usually is expressed in either quantitative scare (e.g., probability of 10%) or a qualitative rating (e.g., Not Likely). In an embodiment, the Risk Likelihood five-point scale is defined below.

| Risk Likelihood | Definition |
|---|---|
| Certain | Highly likely to occur with a probability >90%. |
| High | Likely to occur with a probability of 60-90%. |
| Moderate | Possible to occur with a probability of 30-60%. |
| Low | Will most likely not occur. The probability of occurring is 10-30%. |
| Not Likely | Highly unlikely to occur with a probability <10% |
| Undetermined | Security policies with status 'No Resources'or 'Manual' or 'Prerequisite' or 'Excluded' are marked with this risk likelihood. |

Some examples of high risk findings include, without limitation:

Implementing 'Just In Time' access for internet-facing virtual machines;

Implementing firewalls and access controls for PaaS databases;

Ensuring public access of secrets and keys stored in Key Management systems is disabled; and Ensuring multifactor authentication is enabled for all users in administrative roles.

Some examples of low risk findings include, without limitation:

Ensuring Audit logs for SQL databases are retained for more than 90 days;

Ensuring logrotate is configured for all Ubuntu servers; and

Ensuring all virtual machines are using Managed Disks.
Cross-Departmental Collaboration Deploying CSPM requires collaboration between information security (InfoSec) and application development teams. While the InfoSec team is responsible for setting the corporate standard (goal), the application development and infrastructure management teams ultimately have responsibility for implementing security and compliance standards.

Figure 19:
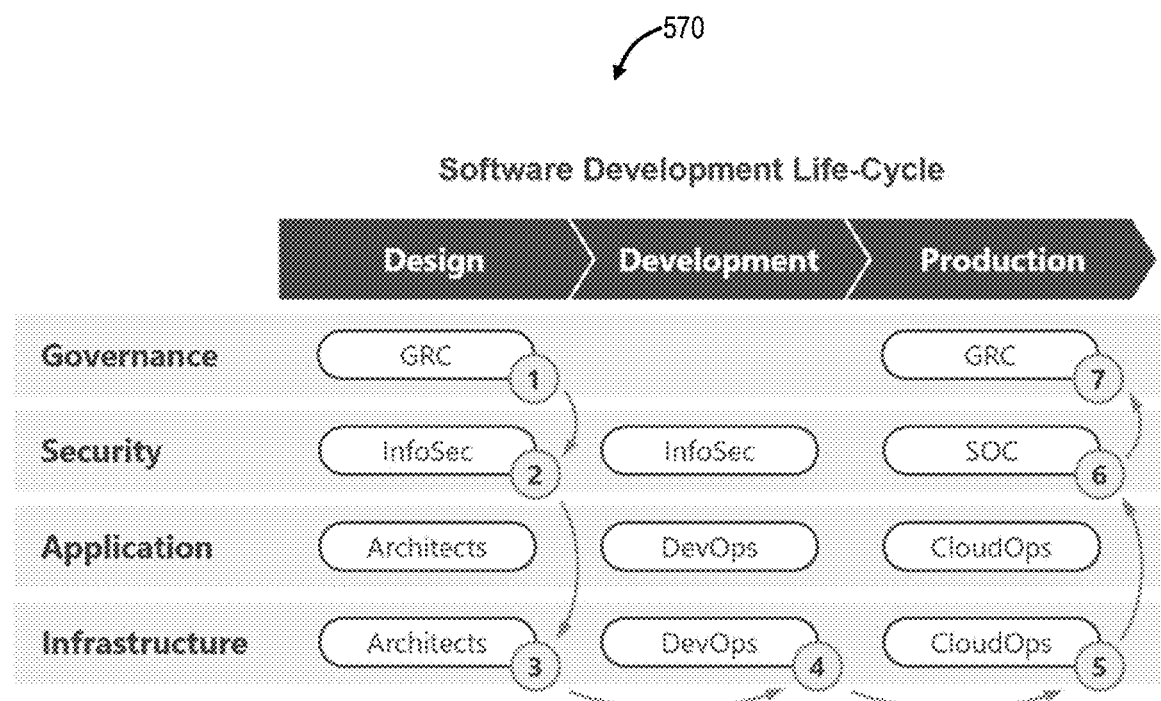
FIG. 19 is a flowchart of a CSPM process for software development in the cloud utilizing the CSPM system and the CSPM processes.
Figure 20:
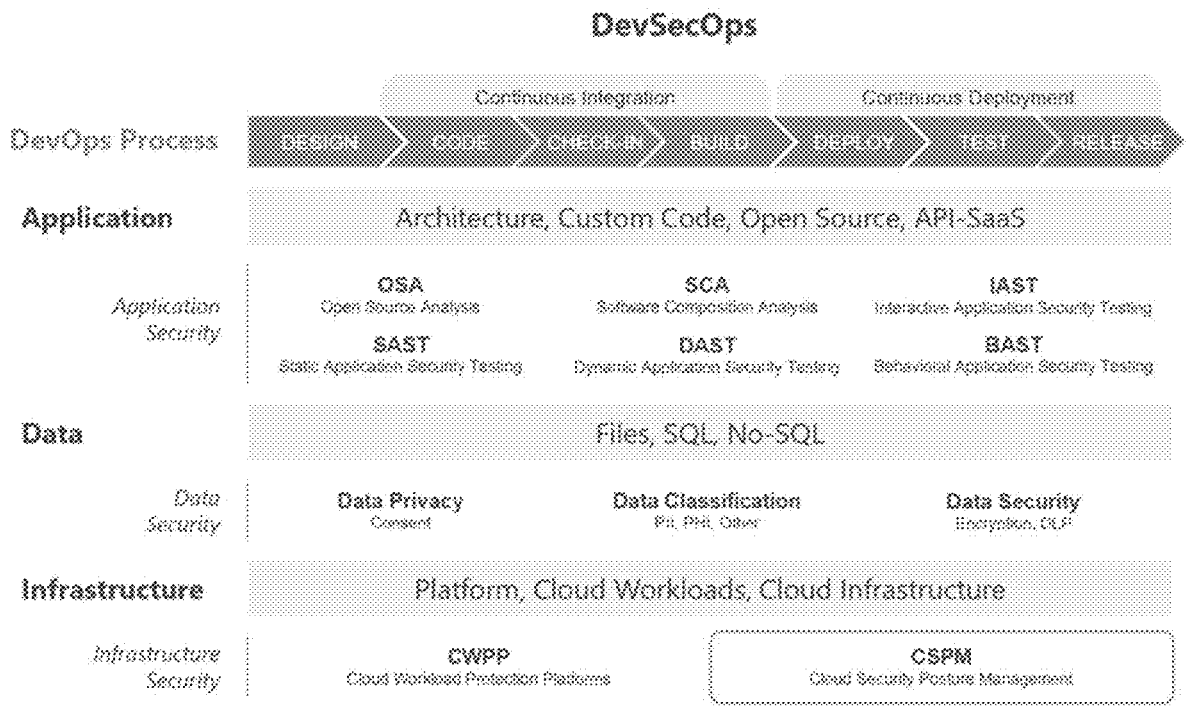
FIG. 20 is a flowchart of a Development Security Operations (DevSecOps) process.

FIG. 19 is a flowchart of a CSPM process 570 for software development in the cloud utilizing the CSPM system 500 and the CSPM processes 550, 560. The CSPM process 570 includes specification of required compliance frameworks (step 1), such as by Governance, Risk & Compliance (GRC), the definition of corporate information security standards (step 2), such as by InfoSec, creation of secure application architecture configurations (step 3), such as by cloud architects, deployment of cloud infrastructure (step 4), such as by DevOps, fixing discovered misconfigurations (step 5), such as by Cloud Ops, monitoring security posture (step 6), such as by a Security Operations Center (SOC), and providing evidence of continuous compliance (step 7), such as by GRC.

GRC teams specify the required industry compliance frameworks (industry benchmarks, laws and regulations). Again, the CSPM described herein supports various compliance frameworks and continuously adds new ones based on customer requirements.

The InfoSec team has the responsibility for defining a set of "must-have" security policies for their organization, including cybersecurity benchmarks and additional company-specific policies. Besides, the CSPM described herein offers the ability to add private benchmarks that customers can track and enforce.

Cloud Architects design cloud infrastructure, taking into account cloud architecture best practices and create secure configuration guides for CloudOps teams. The CSPM described herein provides detailed definitions for all security policies as well as configuration guidance in the form of remediation steps.

Cloud infrastructure in many organizations is deployed manually by the infrastructure management team, while other organizations have automated cloud infrastructure deployment by the DevOps team. The infrastructure management team or DevOps team scan cloud infrastructure using the CSPM system 500 and processes 550, 560 in a preproduction environment. Any discovered misconfigurations need to be fixed before proceeding to production deployment.

The CloudOps team initiates a scan immediately after deployment into the production environment. If the deployed cloud infrastructure is meeting the required standards, it can stay in production. CloudOps team also schedules daily scans of the cloud infrastructure. Any discovered misconfigurations have to be fixed quickly on priority, depending on their risk level.

Production environments should be scanned periodically to validate any last-minute manual configuration changes. SOC teams monitor for deviations and escalate about discovered critical misconfigurations that require immediate fixes.

GRC Compliance teams can have access to daily monitoring results and can provide these reports as evidence for continuous compliance to regulators and auditors.

For DevSecOps security practices, the DevSecOps term is normally used to describe the integration of application security practices into the application development life cycle. Static Application Security Testing (SAST), Dynamic Application Security Testing (DAST) and other tools are used to review against coding best practices, discover security issues and log defects. Penetration tests are used to validate the robustness of the application code before releasing it into production. Runtime application self protection can be implemented.

Data security gained significant importance with the introduction of GDPR. Data privacy, data classification and data security practices need to be validated in the pre-production environment as part of DevSecOps.

Figure 21:
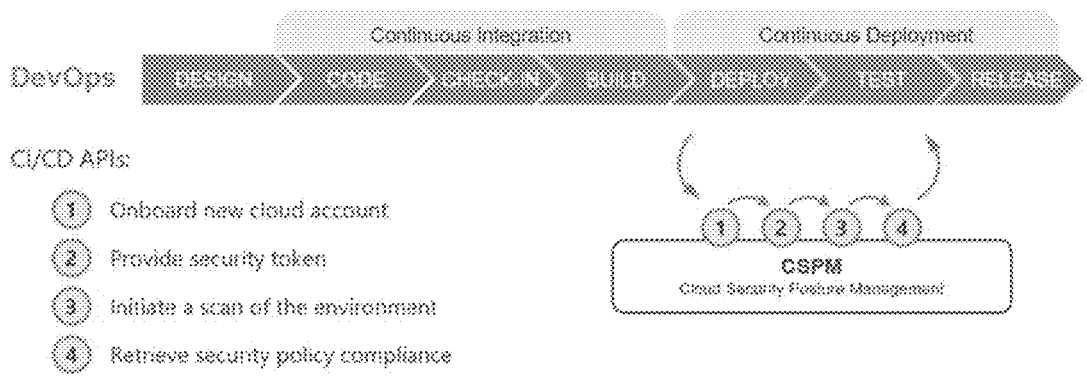
FIG. 21 is a flowchart of the Application Programming Interfaces (APIs) needed for the DevSecOps process of FIG. 20.
Figure 22:
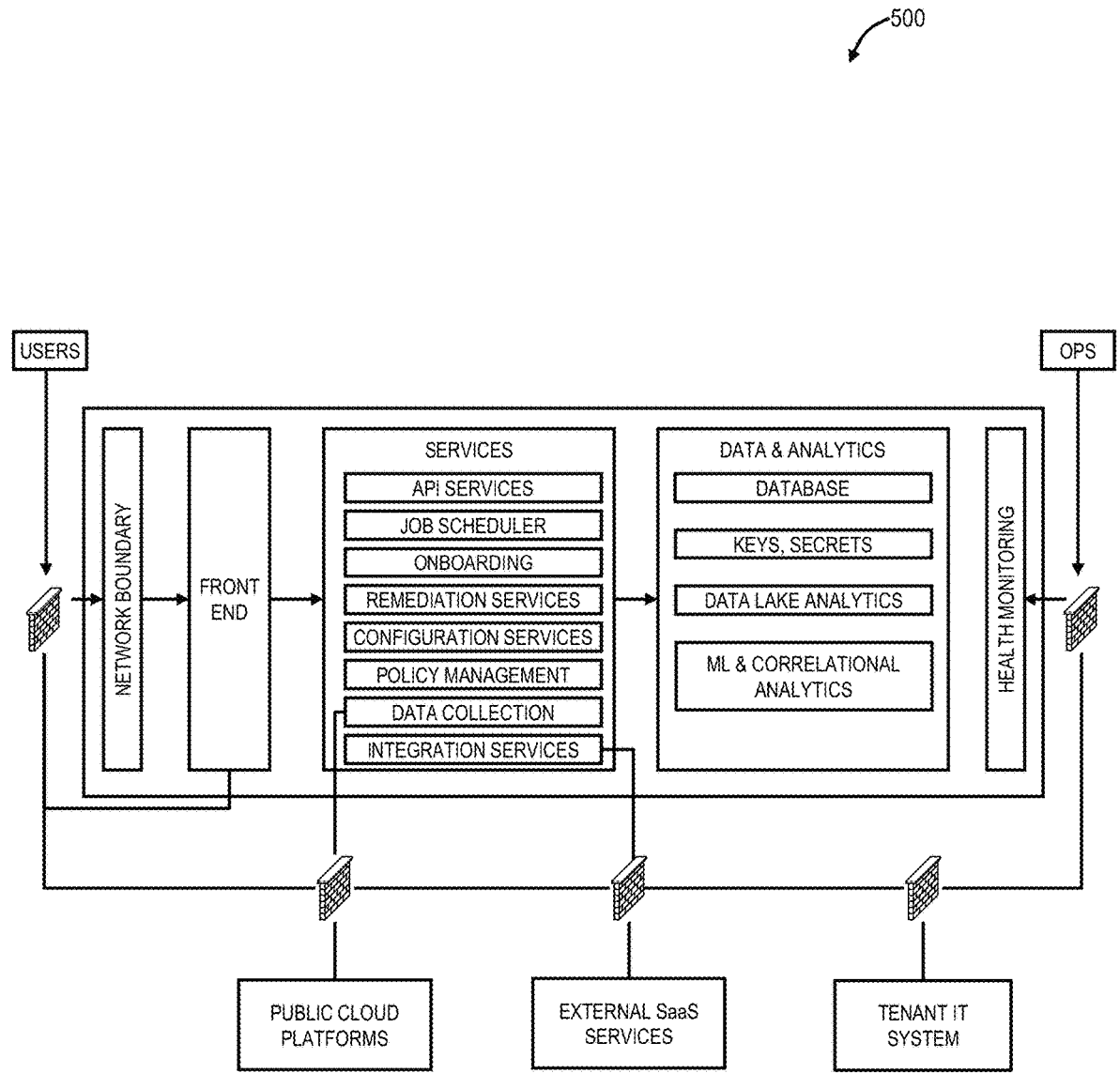
FIG. 22 is a block diagram of additional details of the CSPM system.

FIG. 21 is a flowchart of a Development Security Operations (DevSecOps) process. FIG. 22 is a flowchart of the Application Programming Interfaces (APIs) needed for the DevSecOps process. Ultimately, organizations need to move towards an integrated DevSecOps process covering security best practices across applications, data and infrastructure. A security left-shift needs to happen to identify misconfigurations in pre-production environments and prevent them from getting into production environments. As deployment automation becomes part of the Continuous Integration & Continuous Delivery (CI/CD) pipeline, it is essential that cloud infrastructure configurations are also validated against cloud security best practices. CSPM products need to provide relevant APIs that can be called by CI/CD pipelines.

CSPM products need to support the end to end processes, including: onboarding a new cloud account; providing security token; initiating a scan of the environment (dev, test, other, etc.); and getting security policy "Pass" or "Fail" information automatically to compare against corporate standards.

DevOps teams can use CSPM CI/CD APIs to automatically initiate a rescan after the environment has been built and receive the compliance status for all security policies. Teams can analyze the results of a scan and update their automation repository in line with configuration standards.

Details of the CSPM System

Figure 23:
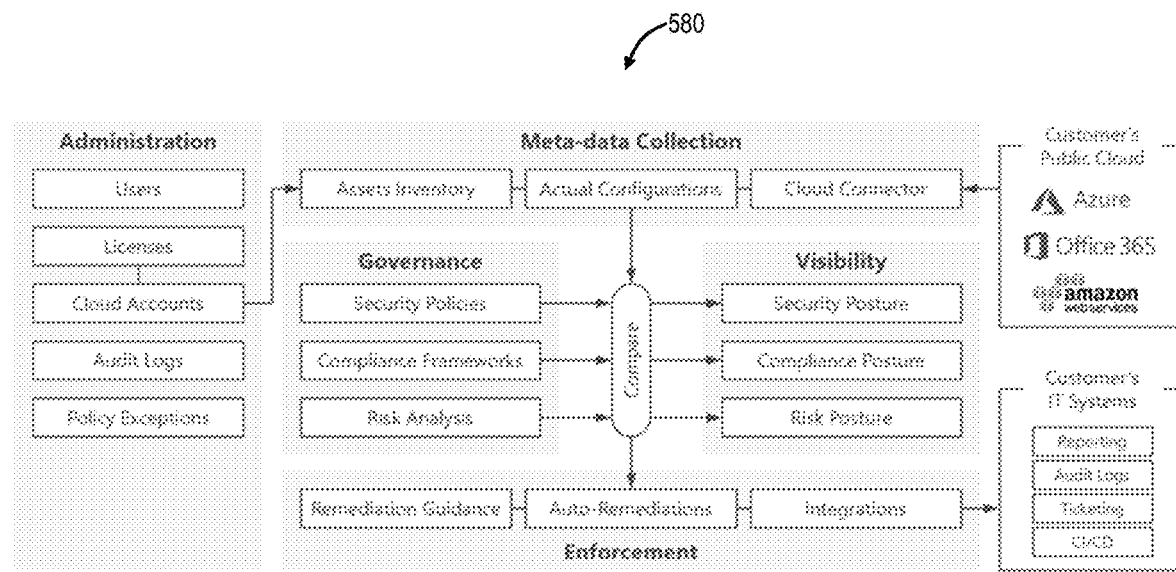
FIG. 23 is a flowchart of another CSPM process.
Figure 24:
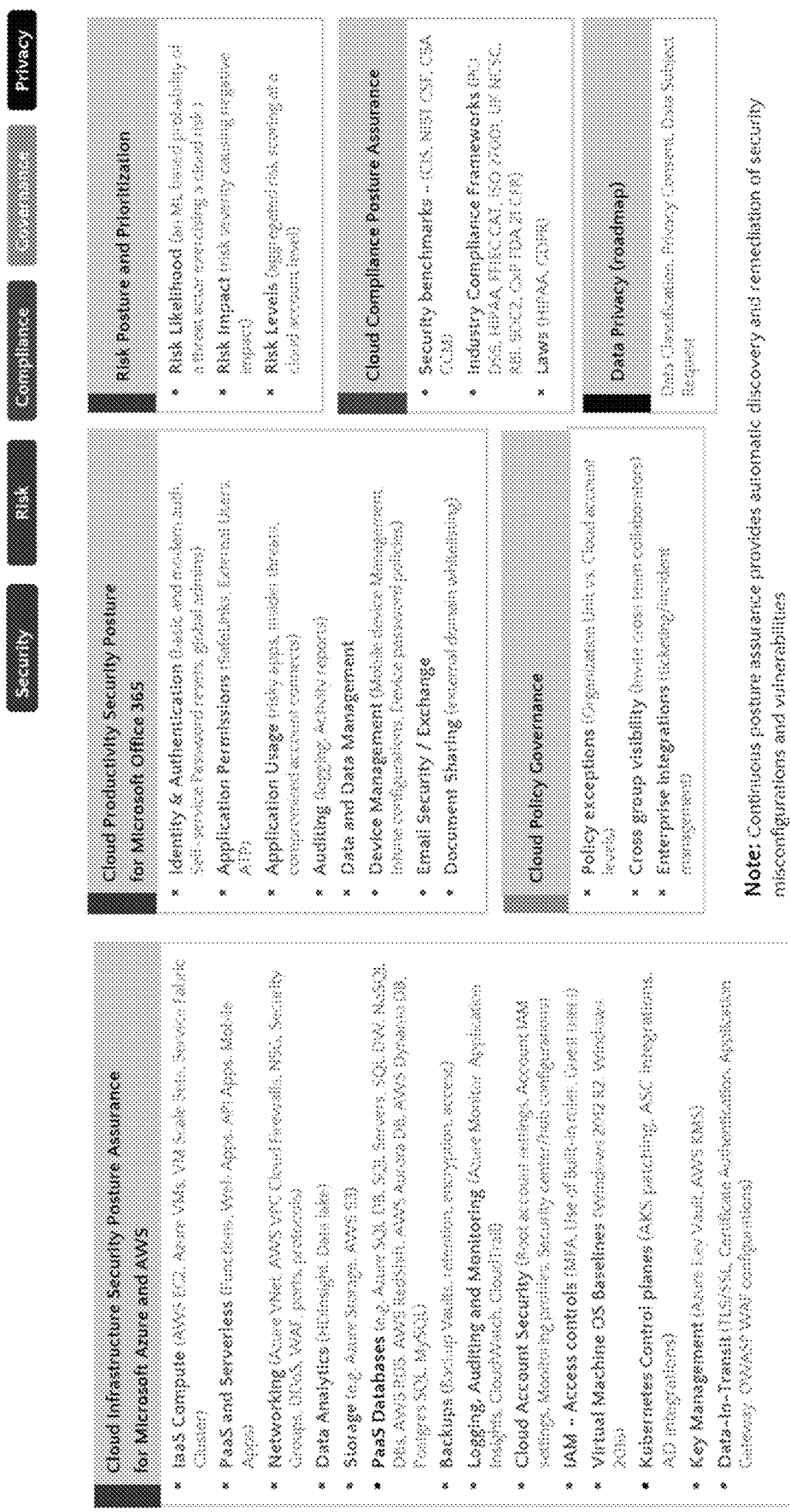
FIGS. 24 and 25 are diagrams of different configurations analyzed including security posture, risk posture, compliance posture, governance posture, and privacy posture.
Figure 25:
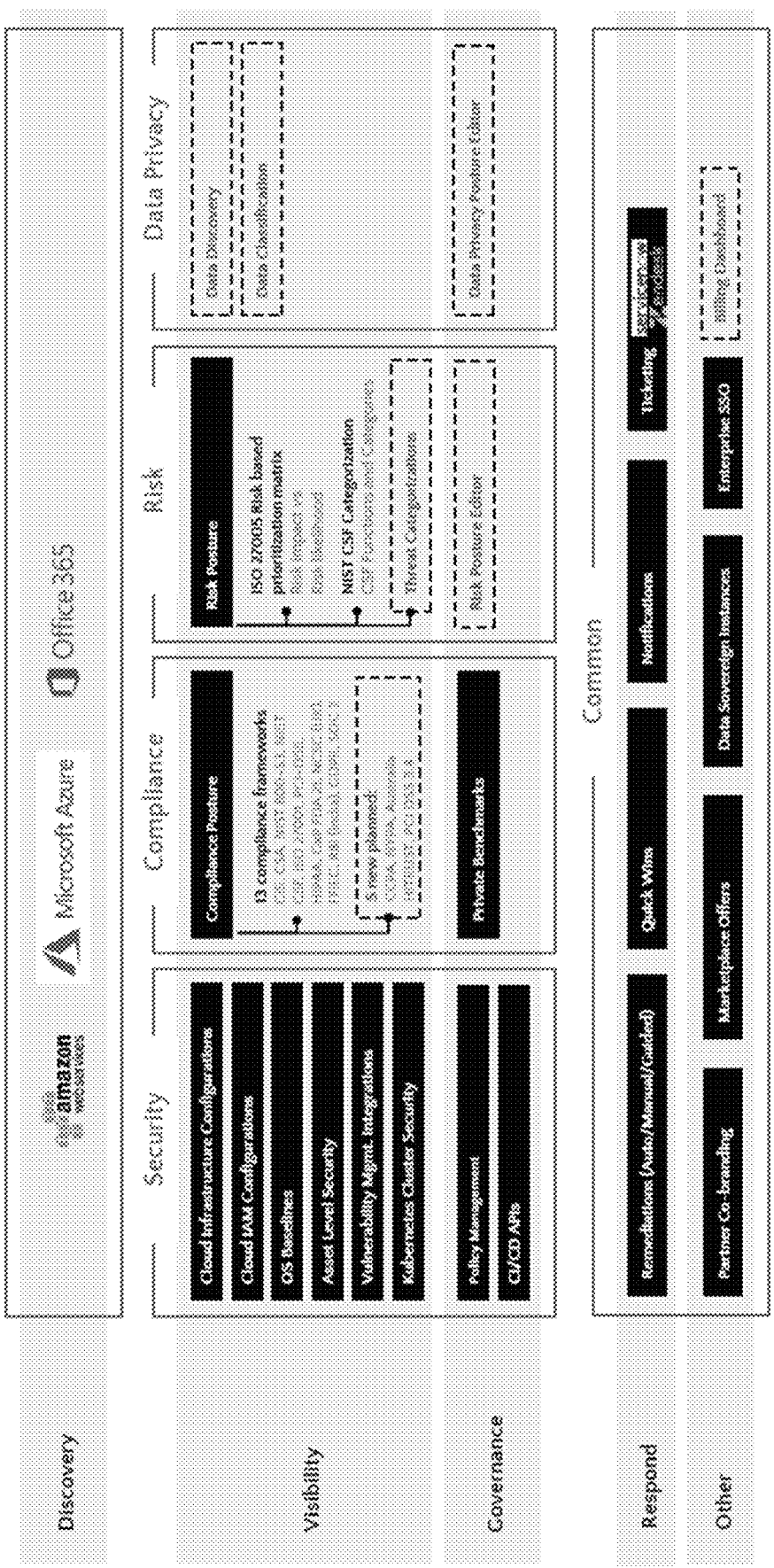

FIG. 22 is a block diagram of additional details of the CSPM system 500. In an embodiment, the CSPM system 500 is delivered through the cloud-based system 100. The components in FIG. 22 are functional components. FIG. 23 is a flowchart of another CSPM process 580. FIGS. 24 and 25 are diagrams of different configurations analyzed, including security posture, risk posture, compliance posture, governance posture, and privacy posture.

CSPM Process with the Cloud-Based System

Figure 26:
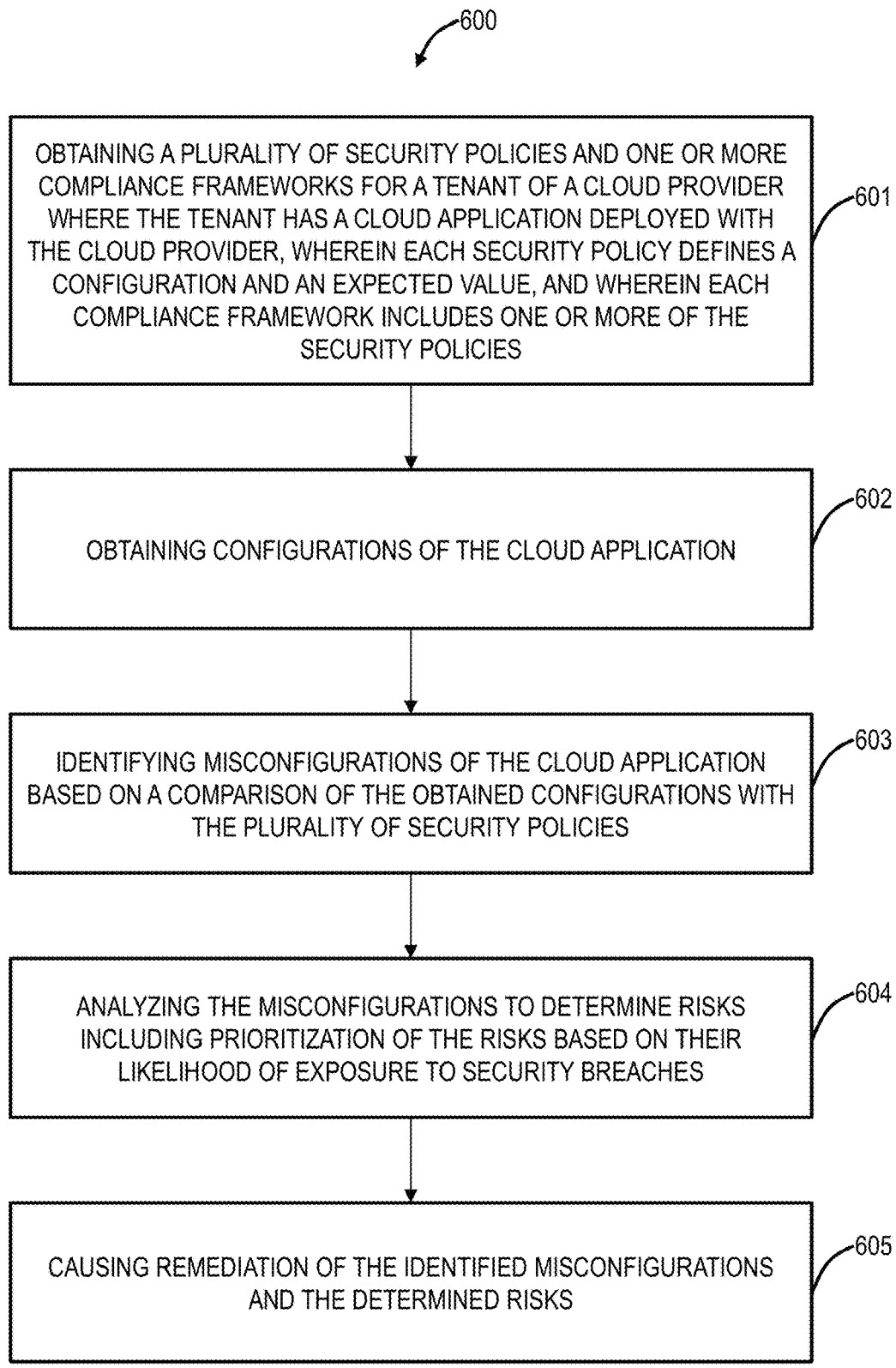
FIG. 26 is a CSPM process implemented with the cloud-based system of FIG. 1.

FIG. 26 is a flowchart of a CSPM process 600 implemented through the cloud-based system 100. The CSPM process 600 includes obtaining a plurality of security policies and one or more compliance frameworks for a tenant of a cloud provider where the tenant has a cloud application deployed with the cloud provider, wherein each security policy defines a configuration and an expected value, and wherein each compliance framework includes one or more of the security policies (step 601); obtaining configurations of the cloud application (step 602); identifying misconfigurations of the cloud application based on a comparison of the obtained configurations with the plurality of security policies (step 603); analyzing the misconfigurations to determine risks including prioritization of the risks based on their likelihood of exposure to security breaches (step 604); and causing remediation of the identified misconfigurations and the determined risks (step 605), wherein the cloud-based system performs the CSPM service in addition to one or more additional cloud services.

The one or more additional cloud services can include any of a cloud security service, a Cloud Access Security Broker (CASB) service, a Data Loss Prevention (DLP) service, and a Zero Trust Network Access (ZTNA) service. The CSPM process 600 can further include causing display of any of a security posture, a compliance posture to the one or more compliance frameworks, a risk posture, and a data privacy posture. The CSPM process 600 can further include determining a risk matrix for the tenant; and causing display of the risk matrix, wherein the risk matrix visualizes risk based on a combination of impact and likelihood. The tenant can have a plurality of users that use the cloud application, and wherein the cloud application is deployed in a public cloud.

The plurality of security policies can 4relate to both cloud infrastructure and the cloud application, wherein the security policies for the cloud infrastructure relate to how the underly cloud resources should be properly configured, and wherein the security policies for the cloud application relate to how the cloud applications should be configured and used. The plurality of security policies can include a combination of out of the box policies that are pre-defined and tenant-defined policies. The obtaining, identifying, analyzing, and causing steps can be performed during the development of the cloud application and while the cloud application is operational.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors in a node in a cloud-based system to perform a Cloud Security Posture Management (CSPM) service via steps of:
   obtaining governance a tenant of a cloud provider where the tenant has a cloud application deployed with the cloud provider, wherein the governance includes (1) a plurality of security policies, each security policy defines a configuration and an expected value, and the plurality of security policies include a combination of out of the box policies and tenant-defined policies, (2) one or more compliance frameworks, each compliance framework includes one or more of the security policies, (3) risk-based prioritization for describing risk of any misconfigurations, and (4) enforcement for any of the misconfigurations;
   obtaining configurations of the cloud application;
   identifying the misconfigurations of the cloud application based on a comparison of the obtained configurations with the configurations of the plurality of security policies, wherein each of the security policies are assigned a status based on a number of compliant resources;
   analyzing the misconfigurations and status to determine risks including prioritization of the risks based on (1) their likelihood of exposure to security breaches and (2) the risk-based prioritization; and
   causing remediation of the misconfigurations and based on the determined risks and the enforcement,
   wherein the cloud-based system performs the CSPM service in addition to one or more additional cloud services.

2. The non-transitory computer-readable storage medium of claim 1, wherein the one or more additional cloud services include any of a cloud security service, a Cloud Access Security Broker (CASB) service, a Data Loss Prevention (DLP) service, and a Zero Trust Network Access (ZTNA) service.

3. The non-transitory computer-readable storage medium of claim 1, wherein the steps further include
   causing display of any of a security posture, a compliance posture to the one or more compliance frameworks, a risk posture, and a data privacy posture.

4. The non-transitory computer-readable storage medium of claim 1, wherein the steps further include
   determining a risk matrix for the tenant; and
   causing display of the risk matrix, wherein the risk matrix visualizes risk based on a combination of impact and likelihood.

5. The non-transitory computer-readable storage medium of claim 1, wherein the tenant has a plurality of users that use the cloud application, and wherein the cloud application is deployed in a public cloud.

6. The non-transitory computer-readable storage medium of claim 1, wherein the plurality of security policies relate to both cloud infrastructure and the cloud application, wherein the security policies for the cloud infrastructure relate to how underlying cloud resources should be properly configured, and wherein the security policies for the cloud application relate to how the cloud application should be configured and used.

7. The non-transitory computer-readable storage medium of claim 1, wherein the obtaining, identifying, analyzing, and causing steps are performed during development of the cloud application and while the cloud application is operational.

8. An enforcement node in a cloud-based system configured to implement Cloud Security Posture Management (CSPM), the enforcement node comprising:
   one or more processors;
   a network interface communicatively coupled to the one or more processors and connected to a network for communication with one or more users and one or more cloud providers with cloud applications deployed thereon; and
   memory storing instructions that, when executed, cause the one or more processors to
      obtain governance for a tenant of a cloud provider where the tenant has a cloud application deployed with the cloud provider, wherein the governance includes (1) a plurality of security policies, each security policy defines a configuration and an expected value, and the plurality of security policies include a combination of out of the box policies and tenant-defined policies, (2) one or more compliance frameworks, each compliance framework includes one or more of the security policies (3) risk-based prioritization for describing risk of any misconfigurations, and (4) enforcement for any of the misconfigurations;
      obtain configurations of the cloud application;
      identify the misconfigurations of the cloud application based on a comparison of the obtained configurations with the configurations of the plurality of security policies, wherein each of the security policies are assigned a status based on a number of compliant resources;
      analyze the misconfigurations and status to determine risks including prioritization of the risks based on (1) their likelihood of exposure to security breaches and (2) the risk-based prioritization; and
      cause remediation of the misconfigurations based on the determined risks and the enforcement,
   wherein the node in the cloud-based system performs the CSPM service in addition to one or more additional cloud services.

9. The enforcement node of claim 8, wherein the one or more additional cloud services include any of a cloud security service, a Cloud Access Security Broker (CASB) service, a Data Loss Prevention (DLP) service, and a Zero Trust Network Access (ZTNA) service.

10. The enforcement node of claim 8, wherein the instructions that, when executed, cause the one or more processors to
   cause display of any of a security posture, a compliance posture to the one or more compliance frameworks, a risk posture, and a data privacy posture.

11. The enforcement node of claim 8, wherein the instructions that, when executed, cause the one or more processors to
   determine a risk matrix for the tenant; and
   cause display of the risk matrix, wherein the risk matrix visualizes risk based on a combination of impact and likelihood.

12. The enforcement node of claim 8, wherein the tenant has a plurality of users that use the cloud application, and wherein the cloud application is deployed in a public cloud.

13. The enforcement node of claim 8, wherein the plurality of security policies relate to both cloud infrastructure and the cloud application, wherein the security policies for the cloud infrastructure relate to how underlying cloud resources should be properly configured, and wherein the security policies for the cloud application relate to how the cloud application should be configured and used.

14. A method, implemented in a node in a cloud-based system, comprising:
   obtaining governance for a tenant of a cloud provider where the tenant has a cloud application deployed with the cloud provider, wherein the governance includes (1) a plurality of security policies, each security policy defines a configuration and an expected value, and the plurality of security policies include a combination of out of the box policies and tenant-defined policies, (2) one or more compliance frameworks, each compliance framework includes one or more of the security policies, (3) risk-based prioritization for describing risk of any misconfigurations, and (4) enforcement for any of the misconfigurations;
   obtaining configurations of the cloud application
   identifying the misconfigurations of the cloud application based on a comparison of the obtained configurations with the configurations of the plurality of security policies, wherein each of the security policies are assigned a status based on a number of compliant resources;
   analyzing the misconfigurations and status to determine risks including prioritization of the risks based on their (1) likelihood of exposure to security breaches and (2) the risk-based prioritization; and
   causing remediation of the misconfigurations based on the determined risks and the enforcement,
   wherein the cloud-based system performs the CSPM service in addition to one or more additional cloud services.

15. The method of claim 14, wherein the one or more additional cloud services include any of a cloud security service, a Cloud Access Security Broker (CASB) service, a Data Loss Prevention (DLP) service, and a Zero Trust Network Access (ZTNA) service.

16. The method of claim 14, further comprising
   causing display of any of a security posture, a compliance posture to the one or more compliance frameworks, a risk posture, and a data privacy posture.

17. The method of claim 14, further comprising
   determining a risk matrix for the tenant; and
   causing display of the risk matrix, wherein the risk matrix visualizes risk based on a combination of impact and likelihood.

18. The method of claim 14, wherein the tenant has a plurality of users that use the cloud application, and wherein the cloud application is deployed in a public cloud.

* * * * *